(12) United States Patent
Bull

(10) Patent No.: US 12,353,944 B2
(45) Date of Patent: Jul. 8, 2025

(54) SCREENING ACTION FOR INDICATING STATUS OF EQUIPMENT

(71) Applicant: Triumph Controls, LLC, North Wales, PA (US)

(72) Inventor: Anthony P. Bull, Sussex (GB)

(73) Assignee: Triumph Controls, LLC, North Wales, PA (US)

( * ) Notice: Subject to any disclaimer, the term of this patent is extended or adjusted under 35 U.S.C. 154(b) by 0 days.

(21) Appl. No.: 18/200,340

(22) Filed: May 22, 2023

(65) Prior Publication Data

US 2023/0385566 A1    Nov. 30, 2023

Related U.S. Application Data

(60) Provisional application No. 63/345,205, filed on May 24, 2022.

(51) Int. Cl.
G06K 7/10    (2006.01)
G06K 19/07    (2006.01)

(52) U.S. Cl.
CPC ..... G06K 7/10366 (2013.01); G06K 19/0723 (2013.01)

(58) Field of Classification Search
CPC ............ G06K 7/10366; G06K 19/0723
See application file for complete search history.

(56) References Cited

U.S. PATENT DOCUMENTS

| | | |
|---|---|---|
| 4,089,275 A | 5/1978 | Pelletier |
| 4,270,370 A | 6/1981 | Oftelie |
| 4,349,302 A | 9/1982 | Ferguson, Jr. |
| 5,433,564 A | 7/1995 | Sundseth |
| 6,811,118 B2 | 11/2004 | Collet et al. |
| 6,967,579 B1 * | 11/2005 | Elizondo ............... B64F 1/368 |
| | | 340/572.1 |

(Continued)

FOREIGN PATENT DOCUMENTS

| | | |
|---|---|---|
| CN | 101229869 | 7/2008 |
| CN | 112686074 | 4/2021 |

(Continued)

OTHER PUBLICATIONS

"EMC Gaskets available at www.TCShielding.com" with a date of Apr. 25, 2022.

*Primary Examiner* — Thien M Le
*Assistant Examiner* — Asifa Habib
(74) *Attorney, Agent, or Firm* — Armstrong Teasdale LLP

(57) ABSTRACT

A smart screening system for identifying the open or closed state of a component of a vehicle such as an aircraft. The component may be, for example, a cargo restraint mechanism or an uplock. An RFID tag is integral with or attached to the component. A screen mounted on the component blocks signals to and from the tag when the component is in one state and allows signals to and from the tag when the component is in the other state. An interrogator sends signals to the tag, receives signals from the tag, ascertains whether the tag is blocked by the screen, and generates an indicator of whether the component is in the open or closed state. A computer receives the indicator from the interrogator and provides a readout identifying the state of the component. The safety of the vehicle is enhanced.

8 Claims, 18 Drawing Sheets

(56) References Cited

U.S. PATENT DOCUMENTS

| | | |
|---|---|---|
| 7,030,760 B1 | 4/2006 | Brown |
| 7,075,435 B2 | 7/2006 | Jesser |
| 7,239,238 B2 | 7/2007 | Tester et al. |
| 7,479,887 B2 | 1/2009 | Meyer |
| 7,519,463 B2 | 4/2009 | Olsen, III |
| 7,606,530 B1 * | 10/2009 | Anderson ........... H04B 7/15507 455/7 |
| 7,746,228 B2 | 6/2010 | Sensenig et al. |
| 8,058,985 B2 | 11/2011 | Dobson et al. |
| 8,154,404 B2 | 4/2012 | Diener et al. |
| 8,392,286 B2 | 3/2013 | Powers et al. |
| 8,622,298 B2 * | 1/2014 | Huber .................... G06Q 10/08 340/5.5 |
| 8,686,861 B2 | 4/2014 | Chung et al. |
| 9,033,116 B2 | 5/2015 | Breed |
| 9,082,103 B2 * | 7/2015 | Breed .................... G06V 20/52 |
| 10,209,706 B2 | 2/2019 | Lyons et al. |
| 10,331,922 B2 | 6/2019 | Tiwari et al. |
| 10,497,289 B2 | 12/2019 | Debrody et al. |
| 10,820,180 B2 | 10/2020 | Wilkinson |
| 10,829,962 B2 | 11/2020 | Ruth et al. |
| 2004/0069850 A1 | 4/2004 | De Wilde |
| 2005/0119904 A1 | 6/2005 | Tissington et al. |
| 2006/0266087 A1 | 11/2006 | Hamilton et al. |
| 2007/0001809 A1 * | 1/2007 | Kodukula ............... G07F 9/026 340/572.7 |
| 2007/0018787 A1 | 1/2007 | Martinez de Velasco Cortina et al. |
| 2007/0063847 A1 * | 3/2007 | Lee .................... G08B 13/2402 340/572.1 |
| 2007/0262850 A1 | 11/2007 | Willgert |
| 2007/0296545 A1 | 12/2007 | Clare |
| 2008/0100450 A1 * | 5/2008 | Ayyagari ............... B64D 25/18 340/572.7 |
| 2008/0129504 A1 * | 6/2008 | Killian ................ G06K 19/0717 340/572.1 |
| 2008/0231438 A1 * | 9/2008 | Curcio ................... G07C 5/085 340/539.13 |
| 2009/0066503 A1 | 3/2009 | Lin |
| 2010/0156606 A1 | 6/2010 | Gold |
| 2010/0194579 A1 * | 8/2010 | Choi .................... B65D 90/00 340/686.6 |
| 2010/0253519 A1 | 10/2010 | Brackmann et al. |
| 2011/0018707 A1 | 1/2011 | Dobson et al. |
| 2011/0313563 A1 * | 12/2011 | Huber .................... G06Q 10/08 700/214 |
| 2013/0063008 A1 * | 3/2013 | Martin .................... G07F 9/06 340/5.7 |
| 2014/0067313 A1 | 3/2014 | Breed |
| 2014/0081813 A1 * | 3/2014 | Breed ................. G06Q 10/087 705/28 |
| 2014/0138440 A1 * | 5/2014 | D'Ambrosio ........... G07C 9/37 235/385 |
| 2017/0022015 A1 * | 1/2017 | Göllü .................... G06K 7/1413 |
| 2019/0244158 A1 | 8/2019 | Sun et al. |
| 2019/0303862 A1 | 10/2019 | Bollinger et al. |
| 2021/0005033 A1 | 1/2021 | Roman et al. |
| 2021/0082220 A1 * | 3/2021 | Boerger ................ G07C 9/10 |

FOREIGN PATENT DOCUMENTS

| | | |
|---|---|---|
| NZ | 541176 | 2/2008 |
| RU | 2747428 | 5/2021 |
| WO | 20120122268 | 5/2012 |

* cited by examiner

SCREENING ACTION FOR INDICATING STATUS OF EQUIPMENT

RELATED APPLICATION

This application claims the benefit of priority to U.S. Provisional Patent Application Ser. No. 63/345,205, filed on May 24, 2022, the contents of which are incorporated in this application by reference.

TECHNICAL FIELD

The present disclosure relates generally to systems for monitoring and indicating (i.e., reporting) the status of equipment and, more particularly, to a system including one or more tag technologies for monitoring and indicating the status of equipment used in and on aircraft.

BACKGROUND OF THE DISCLOSURE

Equipment may be complex, be composed of many mechanical and electrical parts and systems, and perform jobs where interruption of the performance may be undesirable. In order for the equipment to maintain reliable performance, it would be beneficial to monitor and accurately report the status of the equipment in real-time or near real-time. One attempt to monitor and report the status of a particular type of equipment, namely, industrial equipment, is disclosed in U.S. Pat. No. 10,209,706 issued to General Electric Company.

The industrial equipment may include a gas turbine, wind turbine, gas engine, diesel engine, reciprocating engine, and the like. The system disclosed in the '706 patent, like many conventional systems, includes one or more sensors coupled to the industrial equipment, wherein the one or more sensors are configured to obtain one or more measurements associated with one or more operating characteristics of the industrial equipment. The system also includes a computing device that has a user interface and one or more processors. The one or more processors are configured to: receive the one or more measurements of the one or more operating characteristics of the industrial equipment; determine a status of the industrial equipment based on the one or more measurements; determine a date and a time based on the one or more measurements; and update a cell in a grid of cells organized according to time increments based on the status, the date, and the time.

A problem with the system disclosed in the '706 patent, like many conventional systems, is that the system relies upon sensors. Sensors create a host of problems. An initial problem is the choice of sensor: which sensor of the many available sensor options is best for the performance task? When selecting a sensor, it is always good practice to have a list of the conditions in which the sensor must operate, and the range of measurements required. Using this set of criteria it is possible to eliminate certain sensors as candidates so that, for example, only the sensors that can withstand high temperatures or other adverse conditions remain as potential options. Dust, other contaminants, vibrations, shocks, and exposure to high temperatures all have a shortening effect on the average lifespan of a sensor; therefore, it is important to select a sensor that overcomes these problems by design, rather than just accepting frequent sensor failure and replacement as part and parcel of using sensors. It is also worth looking at the physical location of the sensor and checking whether environmental effects can be minimized by moving the sensor.

The mounting style of the sensor can also cause problems with detection. For example, sensors that detect the presence of a particular metal should not be mounted on that type of metal without a free zone between the sensing face and the metal on which the sensor is mounted. Incorrect mounting leads to false detection readings and sometimes this simple factor is overlooked, leading to a lengthy process of trying different sensors when all that is needed is a tweak to the mount. The materials around the sensor, as well as those it is expected to detect, present a vital factor to consider when choosing the right sensor; otherwise, the sensor may detect things it is not supposed to detect. Another common problem with sensors is their susceptibility to pollution and contamination on the sensing face. If the sensor relies on positive contact between two switches and there is any intervening matter (even dust) then sensing can fail.

The present disclosure relates specifically to systems for monitoring and indicating the status of equipment used in and on aircraft. The use of sensors in such systems typically introduces other problems, including the cost of the sensors and the significant wiring that must be routed through the aircraft. Among the relevant aircraft equipment that would benefit from an improved system that avoids the use of sensors is the equipment for stowing pallets of containers and, more particularly, to cargo unit load device restraining modules for use in the bay of an aircraft.

Cargo is frequently transported in containers or pallets, generally referred to as unit load devices, to facilitate loading, unloading, and constraining operations. Use of such cargo containers and pallets is important for transport vehicles such as ships, trains, and trucks and is particularly desirable when the transport vehicle is an airplane. When cargo is shipped by aircraft it becomes particularly important that the containers or pallets be securely fastened to the aircraft floor structure to prevent shifting of the cargo during takeoff, landing, and in-flight, where sudden loading conditions may be encountered. In vehicles such as aircraft, which have to travel at high speed, the containers or pallets containing the cargo to be carried may weigh up to several tons and must nevertheless be solidly stowed on the platform of the bay of the vehicle by suitable devices in order to reduce to an absolute minimum the risk of movement of these pallets during flight or in the event of rough landings.

In attempting to control and prevent such cargo shifts, and to assist in the loading and unloading of cargo, often quite complex and expensive cargo handling and restraint systems have been devised. Conventionally, as disclosed in U.S. Pat. No. 5,433,564 assigned to Electro Pneumatic International GmbH of Germany, a container is secured in the cargo hold of an aircraft by a latch comprising a frame having a floor part to which are attached two upwardly extending side parts. At least one latch-arm is mounted on an axle set between the side parts so that it can rotate from a lower, inoperative position into an upright, locking position. Restraint mechanisms are used to fasten the latch to a floor of the cargo hold. The disclosed cargo latch includes at least one resiliently deformable section in the floor part of the frame so that in use when a force is applied to the latch-arm, the side parts of the frame can move relative to the floor part as the floor part is deformed. A latch of this kind is intended to ensure increased operational reliability with no increase in weight over a conventional latch.

U.S. Pat. No. 4,089,275 assigned to Societe d'Exploitation des Establissements H. Pelletier of France discloses another example of a cargo restraint mechanism. A lock for stowage of freight in a vehicle includes two latches pivotally mounted transversely between two supporting spars and provided with anchor flanges for the freight. The latches are pivotable between open and closed positions. The lock includes a manual locking member mounted to be able to rotate about the pivot axis of the two latches, one latch cooperating with a locking lever which is able to rock about a transverse pivot fixed to the spars. The latches have bearing surfaces which cooperate with the locking member in the open and closed positions. The latches are especially applicable to the stowage of freight in the bays of freight aircraft.

U.S. Pat. No. 4,349,302 assigned to Lockheed Corporation of Burbank, California, discloses yet another example of a cargo restraint mechanism for restraining cargo pallets. The mechanism includes two links rotatably attached to a frame member, and a latch member pivotably attached to the links. One link is provided with a lever and the latch includes a cargo restraint lip. The mechanism is erected by pressing the lever thereby raising the restraint lip above the plane of the top surface of the frame and into a cargo pallet engaging position. A downward force delivered to the top surface of the restraint lip retracts the restraint mechanism beneath the plane of the top surface of the frame. A helper leaf spring follows a cam surface on the other link causing a snap-type action in the mechanism. The frame may include an additional mechanism such as a separately actuatable and retractable seat pallet guide.

The use of radio-frequency identification (RFID) technology has been disclosed to detect and communicate the status (e.g., location, identification, open or closed) of the individual containers that comprise cargo. RFID tags are well known. Such tags are often provided in the form of a label or a literal "tag" that can be placed on or affixed to an object such as a container. RFID tags are also sometimes integrated with a host object or its packaging. RFID tags typically comprise an integrated circuit and one or more antennas. The integrated circuit typically carries out a variety of functions including modulating and demodulating radio frequency signals, data storage, and data processing. Some integrated circuits are active or self-powered (in whole or in part) while others are passive because completely dependent upon an external power source (such as an RFID tag reader) to support their occasional functionality.

RFID readers are devices that attempt to read any RFID tags within range of the reader. Typically, the RFID reader transmits electromagnetic energy through free space to any tags within range. The energy is received at any RFID tag in range, modulated with identification or other data stored in the RFID tag, and backscattered by the RFID tag back to the reader. The RFID reader receives the backscattered energy and demodulates the energy to recover the data. In other forms, the RFID reader induces a response within the RFID tag using electromagnetic force, the induced response is then modulated with the data of the RFID tag which then induces a corresponding response back in the RFID reader which demodulates the response to recover the data. The data recovered by the RFID reader are then processed in accordance with the purpose of the reading.

Conventional RFID tag locating systems typically use triangulation techniques in which differences in the timing of receptions of a transmission by an RFID tag by at least three readers allow the location of the RFID tag to be derived. The timing of the receptions must be known to very high accuracy so that the differences can be determined with sufficient precision to permit calculation of a transmitting location. The RFID tags transmit at a predetermined power level either periodically or in response to an interrogation or other signal.

There are proposals to use RFID tags to identify individual items. The Electronic Product Code (EPC) as managed by EPCGlobal, Inc. represents one such effort. EPC-based RFID tags each have a unique serial number that uniquely identifies each tag and, by association, each item correlated on a one-for-one basis with such tags. See the corresponding document entitled "EPC Radio-Frequency Identity Protocols Class-1 Generation-2 UHF RFID Protocol for Communications at 860 MHz-960 MHz Version 1.0.9" for additional information about using RFID tags to identify individual items.

U.S. Pat. No. 10,820,180 assigned to Walmart Apollo, LLC of Bentonville, Arkansas, discloses methods and apparatuses that use RFID devices to assist in determining an open status of a container. For example, a first RFID tag is fixed to a first portion of the container and a second RFID tag is fixed to a second portion of the container. Upon a user action to open the container at least partially, the first and second portions will move relative to each other, such that one or more of the RFID tags will no longer be readable by a receiver circuit proximate the container or will now be readable by the receiver circuit. The reading or cessation of reading of one or more RFID tags indicates at least one open status of the container. In some embodiments, the open status is at least one of an unsealing confirmation, an open motion initiation status, an open motion confirmation, a partial open status, and a fully open status.

U.S. Pat. No. 8,686,861 assigned to Panasec Corporation of Princeton Junction, New Jersey, discloses an RFID system and a method that uses an RFID device. The RFID device senses a thing or condition interior to a closable container at or proximate the RFID device and transmits messages. The messages include information uniquely identifying the RFID device and information relating to the thing or condition sensed at or proximate the RFID device. Information in the received messages relating to the thing or condition sensed at or proximate the RFID device advises whether the container is closed, is not closed, has been closed, or has been not closed, or any combination thereof, whereby an opening of and/or tampering with the container may be detected. Messages received from the RFID device, as well as an indication of a condition, may be relayed to a remote location.

Cargo containers on vehicles such as aircraft are held in position by latches, container stops, and container side guidance (i.e. "hold-down") devices that are moved manually into position when the cargo containers are loaded on the aircraft. The limited space in the cargo hold and the manual operation of these devices combine to generate frequent occurrences when the hold-down device is not closed correctly due to operator oversight, bad positioning of the devices, or simply expediency to complete loading in as short a time as possible. Failure to close the hold-down devices has the potential to allow the cargo to shift during take-off, flight, or landing, potentially shifting the cargo to a position that moves the center of gravity of the aircraft to a critical position, whereby the aircraft can no longer maintain safe flight. A number of cargo aircraft accidents have been attributed to cargo shifting due possibly to poorly closed hold-down devices. Currently, operators manually check for loose and open cargo latches.

A need remains for a system that would enable cargo loaders, supervisors, or pilots to interrogate the hold-down devices via a remote computer or hand-held computer to ascertain whether the hold-down devices are all closed and that the cargo is therefore securely held. An object of such a system would be to minimize if not eliminate the risk of incorrectly closed hold-down devices. Related objects would be to minimize the likelihood of cargo shift during flight and to improve the safety of cargo aircraft.

SUMMARY OF THE DISCLOSURE

To meet this and other needs, to achieve these and other objects, and in view of its purposes, the present disclosure provides a smart screening system for identifying the open or closed state of a component in a vehicle. The system includes an RFID tag integral with or attached to the component and configured to send and receive signals. A screen is integral with or mounted on the component so that the screen blocks the signals to and from the RFID tag when the component is in either the open or closed state and allows the signals to and from the RFID tag when the component is in the other state. An interrogator is configured to send the signals to the RFID tag, to receive the signals from the RFID tag, to ascertain whether the RFID tag is blocked by the screen, and to generate an indicator of whether the component is in the open or closed state. A computer is configured to receive the indicator from the interrogator and provide a readout identifying the state of the component. The safety of the vehicle is enhanced.

The present disclosure further provides a smart screening system for identifying the open or closed state of a cargo restraint mechanism configured to hold cargo in a vehicle. The system includes an RFID tag integral with or attached to the cargo restraint mechanism and configured to send and receive signals. A screen is integral with or mounted on the cargo restraint mechanism so that the screen blocks the signals to and from the RFID tag when the cargo restraint mechanism is in either the open or closed state and allows the signals to and from the RFID tag when the cargo restraint mechanism is in the other state. An interrogator is configured to send the signals to the RFID tag, to receive the signals from the RFID tag, to ascertain whether the RFID tag is blocked by the screen, and to generate an indicator of whether the cargo restraint mechanism is in the open or closed state. A computer is configured to receive the indicator from the interrogator and provide a readout identifying the state of the cargo restraint mechanism. The likelihood of shift of the cargo is minimized and the safety of both the cargo and the vehicle holding the cargo is enhanced.

The present disclosure still further provides a smart screening system for identifying the open or closed state of an uplock configured to engage a landing gear or a door in an aircraft. The system includes an RFID tag integral with or attached to the uplock and configured to send and receive signals. A screen is integral with or mounted on the uplock so that the screen blocks the signals to and from the RFID tag when the uplock is in either the open or closed state and allows the signals to and from the RFID tag when the uplock is in the other state. An interrogator is configured to send the signals to the RFID tag, to receive the signals from the RFID tag, to ascertain whether the RFID tag is blocked by the screen, and to generate an indicator of whether the uplock is in the open or closed state. A computer is configured to receive the indicator from the interrogator and provide a readout identifying the state of the uplock. The safety of the aircraft is enhanced.

Also provided are a related system and at least one computer-readable non-transitory storage media embodying software. The one or more computer-readable non-transitory storage media embodying software is operable when executed, in one embodiment, to perform a series of steps using the smart screening system.

It is to be understood that both the foregoing general description and the following detailed description are exemplary, but are not restrictive, of the disclosure.

BRIEF DESCRIPTION OF THE DRAWING

The disclosure is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures:

FIG. 6A is cross-sectional view of a shielding cradle and corresponding recess in the latch body;

FIG. 6B is a top perspective view of the latch body in which the RFID tags are embedded, depicted in the open position in which the RFID tags are not screened;

FIG. 6C is a top perspective view of the shielding cradle;

FIG. 6D is a highlighted view of one of the fingers of the shielding cradle shown in FIG. 6C;

DETAILED DESCRIPTION OF THE DISCLOSURE

Figure 1A:
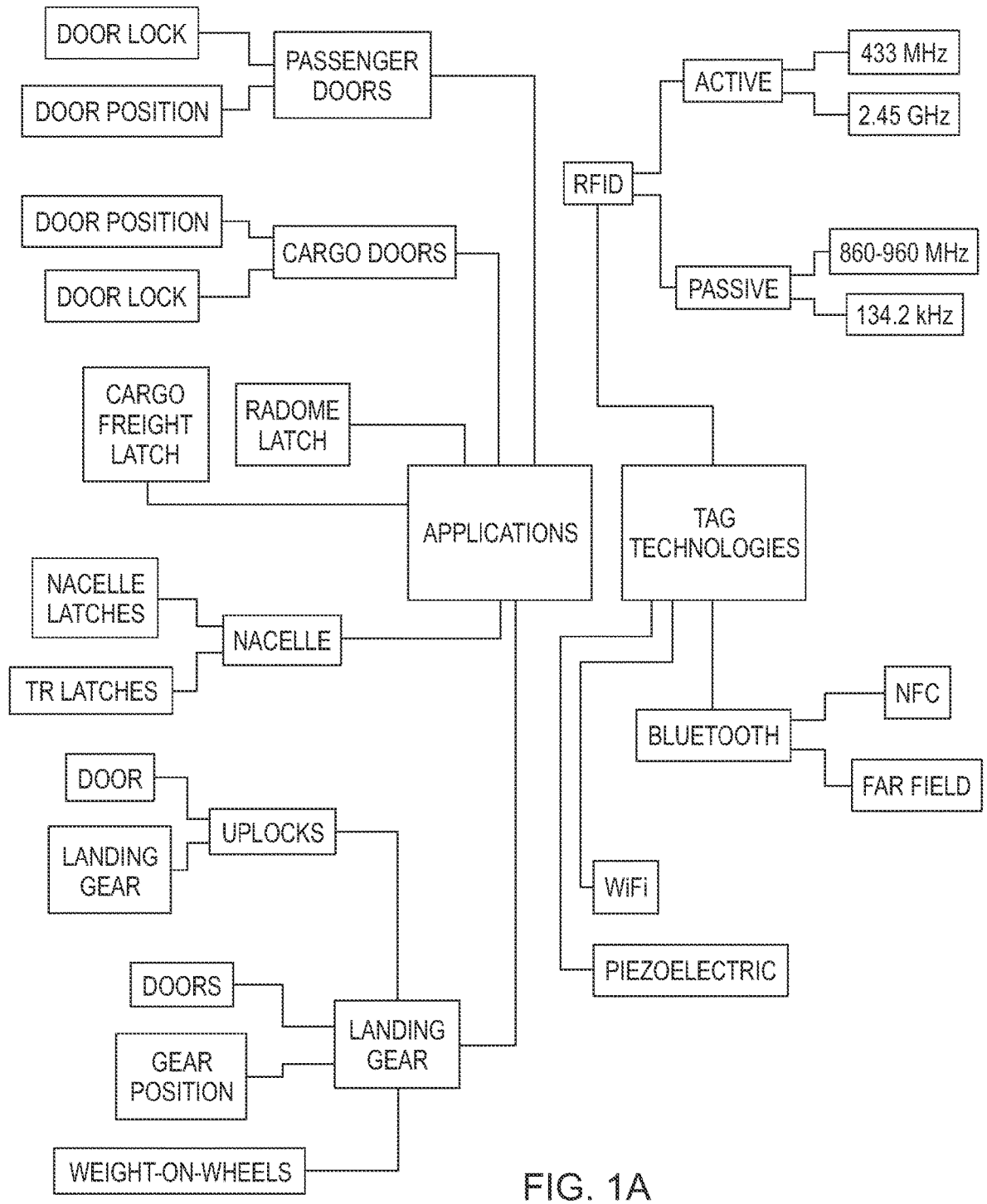
FIG. 1A is a schematic overview of the present disclosure, depicting four tag technologies that can be used in a variety of aircraft applications.

In this specification and in the claims that follow, reference will be made to a number of terms which shall be defined to have the following meanings ascribed to them. The term "substantially," as used in this document, is a descriptive term that denotes approximation and means "considerable in extent" or "largely but not wholly that which is specified" and is intended to avoid a strict numerical boundary to the specified parameter. Directional terms as used in this disclosure—for example up, down, right, left, front, back, top, bottom—are made only with reference to the figures as drawn and are not intended to imply absolute orientation.

The term "about" means those amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When a value is described to be about or about equal to a certain number, the value is within ±10% of the number. For example, a value that is about 10 refers to a value between 9 and 11, inclusive. When the term "about" is used in describing a value or an end-point of a range, the disclosure should be understood to include the specific value or end-point. Whether or not a numerical value or end-point of a range in the specification recites "about," the numerical value or end-point of a range is intended to include two embodiments: one modified by "about" and one not modified by "about." It will be further understood that the end-points of each of the ranges are significant both in relation to the other end-point and independently of the other end-point.

The term "about" further references all terms in the range unless otherwise stated. For example, about 1, 2, or 3 is equivalent to about 1, about 2, or about 3, and further comprises from about 1-3, from about 1-2, and from about 2-3. Specific and preferred values disclosed for components and steps, and ranges thereof, are for illustration only; they do not exclude other defined values or other values within defined ranges. The components and method steps of the disclosure include those having any value or any combination of the values, specific values, more specific values, and preferred values described.

The indefinite article "a" or "an" and its corresponding definite article "the" as used in this disclosure means at least one, or one or more, unless specified otherwise. "Include," "includes," "including," "have," "has," "having," comprise," "comprises," "comprising," or like terms mean encompassing but not limited to, that is, inclusive and not exclusive.

Overview

This disclosure is directed to a smart screening system 100 for detecting the status (i.e., whether in the open or closed position) of cargo latches, cargo container stops, and cargo side guidance devices, as used for cargo pallets in aerospace, ground, and land applications. Additional applications for the smart screening system 100 include aircraft cargo, naval vessel (commercial and military) cargo, nacelle cowl latches, cargo door lock/position, passenger door lock/position, and landing gear (doors, gear position, uplocks). The fundamental concept is to screen and unscreen a tag technology (RFID, Bluetooth, WiFi, piezoelectric, or the like) to indicate the status (e.g., open or closed) of equipment used on aircraft.

FIG. A is a schematic overview of the present disclosure, depicting four tag technologies (RFID, Bluetooth, WiFi, and piezoelectric) that can be used in a variety of aircraft applications. Among the applications are passenger doors (to indicate the status of door position or door lock), cargo doors (to indicate the status of door position or door lock), cargo freight latches, radome latches, nacelles (to indicate the status of nacelle latches or TR latches), and landing gears (to indicate the status of uplocks, doors, gear position, and weight-on-wheels). The nacelle is a housing that is separate from the fuselage and that holds something, usually engines or some other equipment in an aircraft. A radome is a weatherproof, structural enclosure that confines a radar system or antenna and which minimally attenuates the electromagnetic signal transmitted or received by the antenna. Radomes protect antenna surfaces from the elements and hide antenna electronic equipment from view. A radome is frequently used to keep ice and snow from accumulating on antennas.

In one application, a passive (or active) RFID (radio frequency identification) transceiver tag is integrated (embedded) into a latch, cargo container stop, or cargo side guidance device assembly such that when the latch is in the closed (or open) position the RFID tag will be screened by the action of the latch, stop, or guidance device moving to a discreet position, i.e., opened or closed, or active or inactive position, such that the interrogating device cannot scan the RFID tag. The screening of the RFID tag in effect prevents transmitted RF (radio frequency) signals from reaching the RFID tag or RF signals from the RFID tag being transmitted to a receiver.

The interrogating device transmits an RF interrogation signal to ascertain whether the RFID tag is in the screened position or is not screened. Whether the RFID tag is screened or not screened depends on the position of the RFID tag which is mounted on the latch and therefore depends, in turn, on the latch position or state (i.e., whether the latch is opened or closed).

Multiple latches or a single latch can be interrogated using the RF interrogation system, which includes a device that transmits RF signals to interrogate the RFID tag and then receives the return signal. This device may be, for example, a hand-held computer or a computer integrated with a transceiver plus an antenna to transmit the RF interrogation signal and receive the returned RFID signal. The computer polls which latches are open and which are closed depending on the RFID tags that respond to the RF interrogation signal. Each RFID tag has a unique code that is associated with a specific latch, enabling that latch to be identified. After the RF interrogator polls the latches to ascertain which RFID tags are screened and which are not screened, the interrogator provides a readout status of each latch state: opened or closed depending upon the RFID tag response.

Features of the disclosed smart screening system 100 include: (1) an RFID transceiver tag integrated with a cargo latch, cargo container stop, or cargo side guidance device; (2) screening of the RFID tag to prevent interrogation of the RFID tag when the latch, stop, or guidance device is in one of two different states, i.e., is closed or opened (latched or unlatched); (3) an electrically screened recess in which the RFID tag is mounted; (4) opening of the electrically screened recess by movement of one part of the cargo latch, stop, or side guidance device to un-screen (i.e., render accessible) the RFID tag; (5) monitoring of the screened/unscreened status of the RFID tag; (6) interrogation of multiple or singular latches, stops, or guidance devices to derive their positional states, based on the screened/unscreened status of the RFID tag which is attached to the latch, stop, or guidance device; and (7) a monitoring unit that indicates the status of the latch, stop, or guidance device, i.e., whether it is open or closed based on interrogation of the screened or unscreened RFID tags.

The disclosure introduces a method of integrating passive or active RFID transceiver tags with cargo container hold-down devices such that the action of moving the container hold-down device to its opened or closed position electrically screens or un-screens the RFID tag. A computer integrated with a transceiver interrogates the RFID transceiver tags to check whether they are screened or not screened based on the position (closed or open) of the hold-down devices.

In one embodiment, an antenna or antennae are mounted in the cargo hold and the computer/transceiver unit sends the RF signal through the antenna(e) in the cargo hold. The RF signal is received only by the un-screened RFID tags; these tags respond to the RF interrogation signal and the computer/transceiver unit indicates which of the RFID tags has responded. The loader, supervisor, or pilot can then confirm the integrity and safety of the cargo hold-down devices.

RFID Transponder

Figure 1:
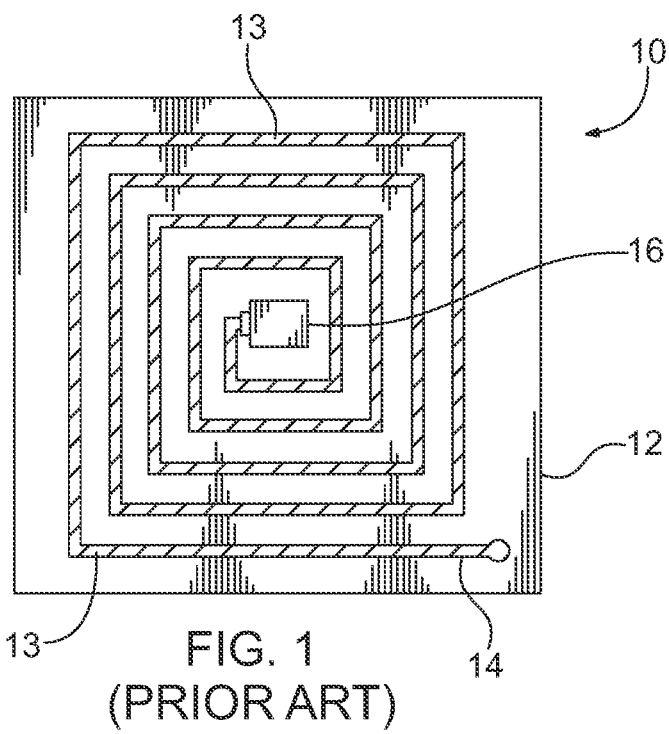
FIG. 1 is a top view of a conventional RFID tag.

Referring now to the drawing, in which like reference numbers refer to like elements throughout the various figures that comprise the drawing, FIG. 1 shows a top view of a conventional RFID tag 10. The term "RFID tag" is meant to include radio frequency identification tags and smart labels, which are also called transponders or transceivers. The word transponder, derived from the combination of TRANSmitter and resPONDER, reveals the function of the device.

As illustrated in FIG. 1, the RFID tag 10 includes a substrate 12 having one or more conductors or circuits 13 and capacitors (referred to generally as a conductor system 14) located in or on the substrate 12 and a RFID chip (or die) 16. The substrate 12 typically is a rigid or flexible PC board on which the RFID chip 16 is affixed.

Figure 2:
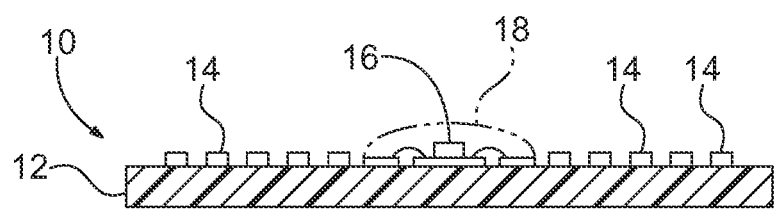
FIG. 2 is a side view of one embodiment of the RFID tag shown in FIG. 1, illustrating the chip of the RFID tag as hard wired to the conductor system.
Figure 3:
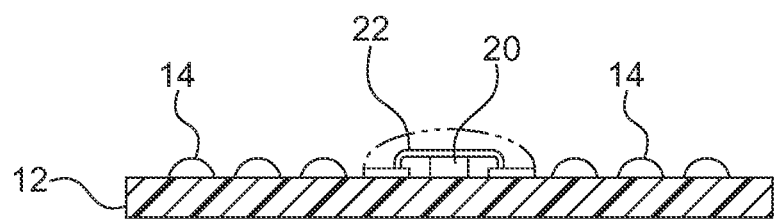
FIG. 3 is a side view of another embodiment of the RFID tag shown in FIG. 1, illustrating the chip of the RFID tag as including a bumped chip on a carrier that is in direct communication with the conductor system.

Referring to FIG. 2, the chip 16 is in communication (i.e., electrically coupled) with the conductor system 14 (e.g., die-bonded) and is typically covered with a protective coating 18. In some instances, the RFID tag 10 is covered (partially or fully) with an anti-static coating or encapsulated in a protective package. The embodiment illustrated in FIG. 2 depicts the chip 16 as hard wired to the conductor system 14. As illustrated in FIG. 3, however, the chip 16 may comprise a bumped chip 20 on a carrier 22 that is in direct communication with the conductor system 14. Various conductor system circuit materials and configurations are typically used. For example, the circuit 13 can be created in a copper layer on the surface of the substrate 12, created in a stamped or edged metal layer that is laminated onto the substrate 12, created in a layer of conductive paint that is applied (i.e., screened) on the surface of the substrate 12, and/or created in a path of wire placed in a specific pattern and attached to the surface of the substrate 12.

Transponder and Reader

Figure 4:
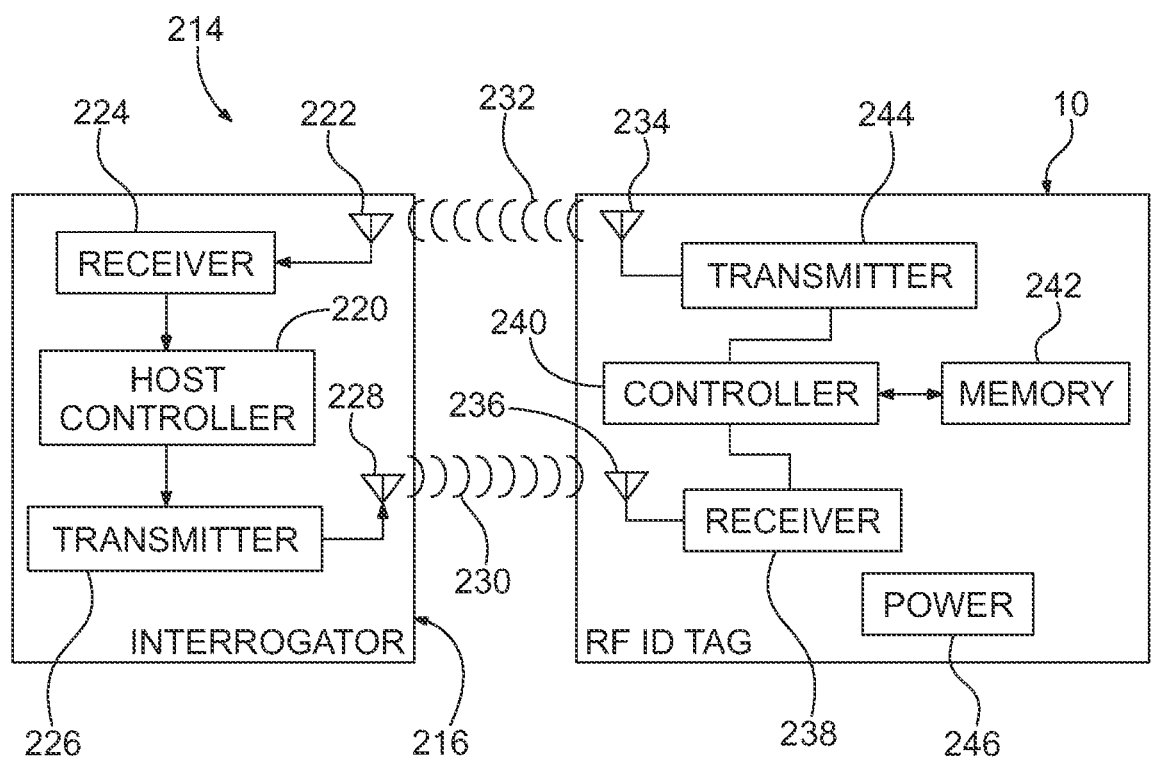
FIG. 4 is a block schematic diagram of a conventional RFID interrogation and tag system.

FIG. 4 illustrates two components of the smart screening system 100 according to one embodiment of the disclosure. Specifically, the smart screening system 100 includes an interrogator 216, also called a reader, and the RFID tag 10, also called a transponder. Although "interrogator" is often used as an alternative to the term "reader," a difference is sometime drawn on the basis of a reader together with a decoder and interface forming the interrogator 216. The RFID tag 10 responds to a transmitted or communicated request for the data it stores by communicating information wirelessly across the space or air interface between the RFID tag 10 and the interrogator 216.

The interrogator 216 includes a host controller 220 to process received information from the RFID tag 10 via a first antenna 222 and a first receiver 224. To retrieve information from the RFID tag 10, the host controller 220 generates a signal which is transmitted by a transmitter 226 and a second antenna 228 as an interrogation command signal 230 (typically, an oscillating RF signal). The RFID tag 10 transmits an RFID signal 232 via a third antenna 234 in response to receipt of the interrogation command signal 230. The first receiver 224 receives the RFID signal 232 via the first antenna 222. The RFID signal 232 includes the identification number of the RFID tag 10. The first antenna 222 of the interrogator 216 receives the RFID signal 232 from the RFID tag 10, decodes the data in the RFID signal 232, and provides a readout.

The RFID tag 10 has a fourth antenna 236 and a second receiver 238 to receive the interrogation command signal 230 from the interrogator 216. The second receiver 238 transfers the received command signal to a controller 240. The controller 240 interprets the command and extracts the corresponding identification number (ID) from a memory 242. The extracted identification number is then transferred by the controller 240 to a transmitter 244 which transmits the ID to the third antenna 234 which broadcasts the RFID signal 232.

The RFID tag 10 may be either passive (no power supply) or active (has a power supply). In active RFID tags, power 246 is provided by a power source such as a battery. In passive RFID tags, the power is induced from the received signal: the RFID tag fourth antenna 236 receives alternating current (AC) energy from the interrogation command signal 230 through inductive coupling and stores this energy or power in a small capacitor. Whether active or passive, the RFID tag 10 uses its power to transmit the RFID tag data (code) to the interrogator 216 through the RFID signal 232. The RFID signal 232 transmitted by the RFID tag 10 is modulated back scatter of the original signal transmitted by the interrogator 216. The controller 240 may have an interface, not shown, to receive data from external transponders such as global positioning sensors.

To transfer data efficiently via the air that separates the two communicating antennas generally requires that the data be superimposed upon a carrier wave, as is common in the communication arts. This process is referred to as modulation, and various schemes are available for this purpose, each having particular attributes that favor their use. Commonly used modulation techniques for RFID tags include amplitude shift keying (ASK), frequency shift keying (FSK), and phase shift keying (PSK). Common carrier frequencies include high frequencies (HF, approximately 3 to 30 MHz), very high frequencies (VHF, approximately 30 to 300 MHz), and ultra-high frequencies (UHF, frequencies above 300 MHz). Higher carrier frequencies allow for faster data rates, but are generally limited to line-of-sight applications. Commonly used commercial RFID systems operate at about 13.56 MHz; others operate at about 915 MHz A passive or active RFID tag 10 can operate at about 915 MHz (ISM band) complying with Federal Communications Commission Rule 15, for example, or other rules that may apply either in the United States or other countries. The frequency can be any frequency permitted under these rules.

When multiple RFID tags 10 are simultaneously in close proximity to the interrogator 216 and the interrogator 216 is broadcasting interrogation and control signals, the RFID tags 10 may simultaneously respond. The responses may collide, and the identification codes may be garbled and lost. Generally, the interrogator 216 will rebroadcast commands to establish an order of broadcast of the RFID tags 10. This ordering of the broadcast is especially enabled by active RFID tags 10.

RFID Tag Incorporated into Cargo Restraint Mechanism

Figure 5A:
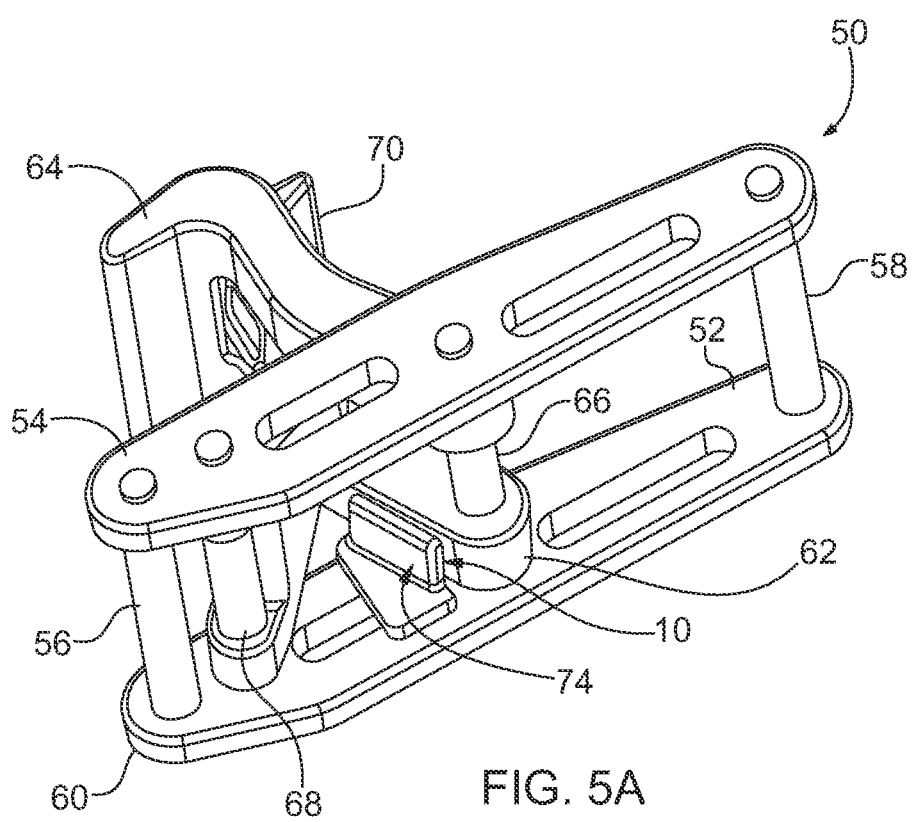
FIG. 5A is a bottom perspective view of a cargo restraint mechanism in accordance with one embodiment of the present disclosure, depicted in the closed or locked position in which the RFID tag is screened.
Figure 5B:
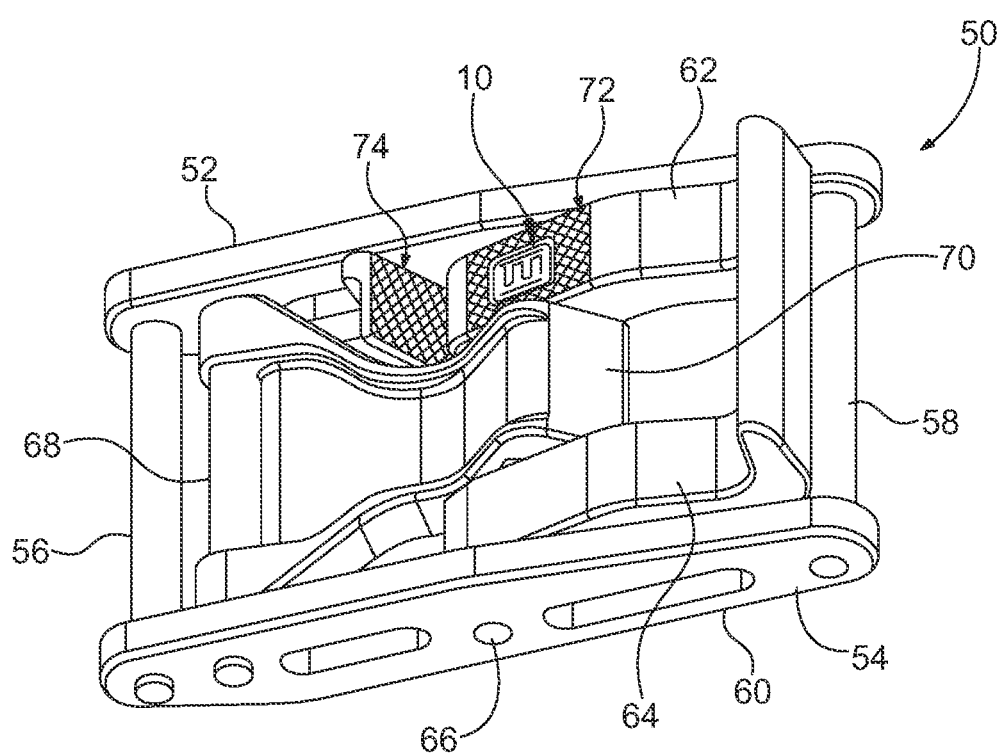
FIG. 5B is a top perspective view of the cargo restraint mechanism shown in FIG. 5A, depicted in the open or unlocked position in which the RFID tag is not screened.

According to the present disclosure, and as illustrated in FIGS. 5A and 5B, the RFID tag 10 can be mounted either onto or into a cargo restraint mechanism 50 such that the movement of certain components of the cargo restraint mechanism 50 causes the RFID tag 10 to be either electrically screened or unscreened when the cargo restraint mechanism 50 is opened or closed. The cargo restraint mechanism 50 can be a latch, as illustrated, or a hold-down device, a container stop, or a side guidance device—among other suitable mechanisms. FIG. 5A is a bottom perspective view of the cargo restraint mechanism 50 in accordance with one embodiment of the present disclosure, depicted in the closed or locked position in which the RFID tag 10 is screened. FIG. 5B is a top perspective view of the cargo restraint mechanism 50 shown in FIG. 5A, depicted in the open or unlocked position in which the RFID tag 10 is not screened.

The cargo restraint mechanism 50 includes a body or frame 60 having a first spar 52 and a second spar 54 connected by multiple rods 56, 58. Preferably, the frame 60 is rigid and is made of metal. Although two rods 56, 58 are illustrated, and suffice to give the frame 60 sufficient rigidity for most applications, additional rods could be provided.

The restraint mechanism 50 includes three primary moving parts rotatably mounted on the frame 60. The moving parts include a first latch arm 62, a second latch arm 64, and a locking lever 70. The first latch arm 62 and the second latch arm 64 are disposed on opposite sides of the locking lever 70, which is centrally positioned within the frame 60 in the space between the latch arms 62 and 64, and are pivotally connected to the locking lever 70. The first latch arm 62 and the second latch arm 64 each rotate together about a first pin 66 attached to the frame 60; the locking lever 70 rotates about a second pin 68 attached to the frame 60. The pins 66, 68 and the rods 56, 58 may be secured to the spars 52, 54 by any well-known mechanism such as a press or interference fit, interfaced screw threads, deformation, cement, adhesives, and the like. These components may also be integrally formed. By "integral" is meant a single piece or a single unitary part that is complete by itself without additional pieces, i.e., the part is of one monolithic piece formed as a unit without another part.

When not holding cargo, the cargo restraint mechanism 50 is in its first position as shown in FIG. 5B. The first position is the open, unlocked, or retracted position for the restraint mechanism 50 in which the first latch arm 62, the second latch arm 64, and the locking lever 70 are all retracted between the first spar 52 and the second spar 54 of the frame 60. Optionally, a spring, which may be a double-acting leaf spring (not shown), urges the restraint mechanism 50 to remain in its first position. Rather than a spring, a structural stop (or another element) can be used to retain the restraint mechanism 50 in its first position.

In operation, when it is desired to have the cargo restraint mechanism 50 hold or restrain cargo, the user grasps the locking lever 70 and moves the locking lever 70 (and, simultaneously, the latch arms 62 and 64) upward against the force of the spring until the cargo restraint mechanism 50 is in its second position as shown in FIG. 5A. The second position is the closed, locked, or erected position for the cargo restraint mechanism 50 in which the first latch arm 62, the second latch arm 64, and the locking lever 70 are all projected vertically above the first spar 52 and the second spar 54 of the frame 60. Once the cargo restraint mechanism 50 is in its second position, the optional spring urges the cargo restraint mechanism 50 to remain in its second position. Again, rather than a spring, a structural stop (or another element) can be used to retain the cargo restraint mechanism 50 in its second position.

To retract the cargo restraint mechanism 50 after it has been used to hold or restrain cargo, an operator need merely press down on the top of the locking lever 70. Downward force may be applied, for example, by stepping on the locking lever 70, thereby causing the locking lever 70 to rotate about the second pin 68 and the latch arms 62 and 64 to rotate together about the first pin 66, respectively, causing the cargo restraint mechanism 50 to assume the retracted configuration depicted in FIG. 5B. The entire operation can be carried out with or without the presence of the spring.

The RFID tag 10 is mounted on the cargo restraint mechanism 50 in a location or position that enables the RFID tag 10 to indicate to the interrogator 216, through the RFID signal 232, whether the cargo restraint mechanism 50 is in its open or closed state. Preferably, the RFID tag 10 is mounted on a static component of the cargo restraint mechanism 50. For the example embodiment illustrated in FIGS. 5A and 5B, the RFID tag 10 is mounted on the first latch arm 62 of the cargo restraint mechanism 50.

A number of structural embodiments are possible to enable the RFID tag 10 to indicate to the interrogator 216 the open or closed state of the cargo restraint mechanism 50. For the example embodiment best illustrated in FIG. 5B, a screen is provided. The screen has two halves: (a) a back screen 72 located between the RFID tag 10 and the first latch arm 62 and on which the RFID tag 10 is mounted; and (b) a front screen 74 (or cover) which may be mounted on a moving part of the cargo restraint mechanism 50. When the cargo restraint mechanism 50 is in its closed state, as shown in FIG. 5A, the front screen 74 covers the RFID tag 10 so that the RFID tag 10 is sandwiched between the front screen 74 and the back screen 72. This configuration effectively electrically screens the RFID tag 10, preventing the RFID tag 10 from receiving or transmitting RF signals. Thus, when screened or shielded, the RFID tag 10 cannot receive the interrogation command signal 230 or transmit the RFID signal 232. The interrogator 216 determines that the cargo restraint mechanism 50 is in its closed state when the interrogator 216 fails to receive the RFID signal 232 from the RFID tag 10.

In contrast, when the cargo restraint mechanism 50 is in its open state, as shown in FIG. 5B, the front screen 74 does not cover the RFID tag 10. This configuration allows the RFID tag 10 to receive and transmit RF signals. The interrogator 216 determines that the cargo restraint mechanism 50 is in its open state when the interrogator 216 receives the RFID signal 232 from the RFID tag 10.

A wide variety of materials can be used to form the screen. Any material that blocks or shields RF signals is suitable. Example materials are aluminum, mu-metal (which is a human-made alloy that contains iron, copper, chromium, molybdenum, and up to 80% nickel), carbon, and copper. The screen may form a carbon fiber or copper Faraday shield, also known as a Faraday cage. Named after the renowned Michael Faraday, an English scientist who invented the cage in 1836, the Faraday cage is incredibly useful. Manufacturers take strips of carbon fiber or copper wires and weave them together to make a flexible fabric. Typically, this "fabric" will be inserted between two other materials, such as leather. When the wires are weaved together, any magnetic waves that are sent to the screen will bend. The cage will absorb any energy produced by RFID readers, which will create a reliable barrier. An added benefit of having a carbon fiber RFID-blocking screen is that it has an ample amount of durability.

FIGS. 5A and 5B illustrate one embodiment in which the RFID tag 10 can be mounted either onto or into a cargo restraint mechanism 50 such that the movement of certain components of the cargo restraint mechanism 50 causes the RFID tag 10 to be either electrically screened or unscreened when the cargo restraint mechanism 50 is opened or closed. Four other embodiments are illustrated in FIGS. 6A, 6B, 6C, and 6D (shielding cradle and recess); in FIG. 7 (EMC gasket); in FIGS. 8A and 8B (EMC wiper seal); and in FIG. 9 (pivoting flap), respectively. Each of these four embodiments is discussed, in turn, below.

Figure 6A:
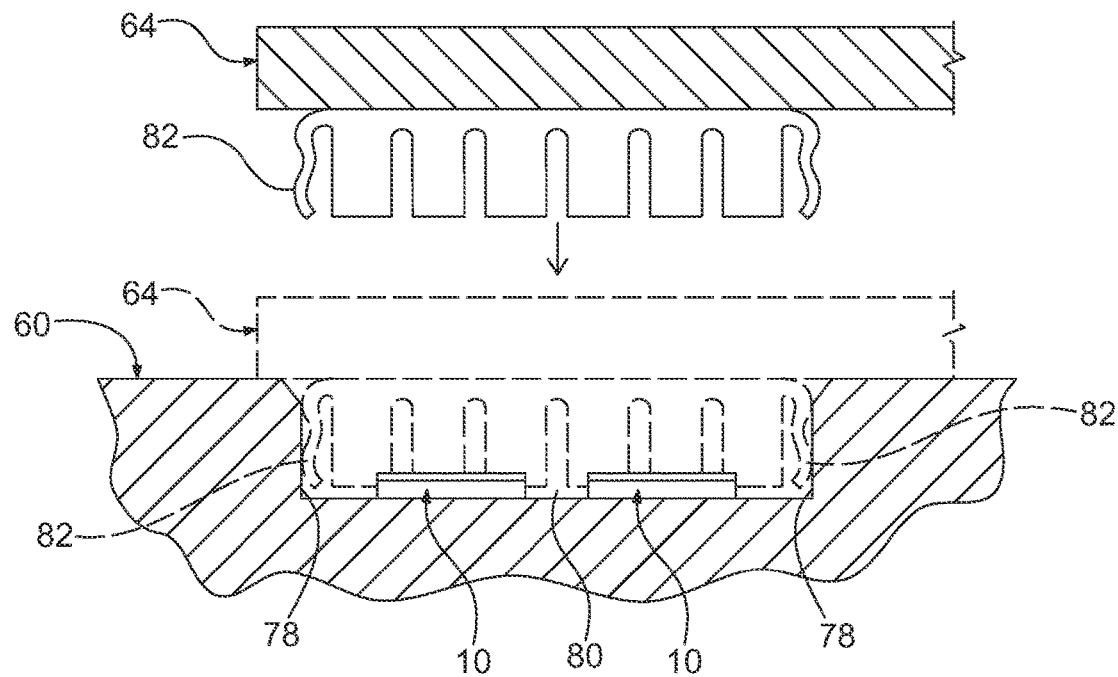
FIGS. 6A, 6B, 6C, and 6D depict a second embodiment illustrating how the RFID tag can be either electrically screened or unscreened when the cargo restraint mechanism is opened or closed and, more specifically.

FIG. 6A is cross-sectional view of a second embodiment illustrating how the RFID tag 10 can be either electrically screened or unscreened when the cargo restraint mechanism 50 is opened or closed. As shown in FIG. 6A, a static component (such as the latch body 60) of the cargo restraint mechanism 50 has a recess 80 in which one or more RFID tags 10 is or are embedded. A moving component (such as the second latch arm 64) of the cargo restraint mechanism 50 has a shielding cradle 82. The shielding cradle 82 may be integrally formed with the second latch arm 64. Alternatively, the shielding cradle 82 may be a separate component that is affixed to the bottom of the second latch arm 64.

Figure 6B:
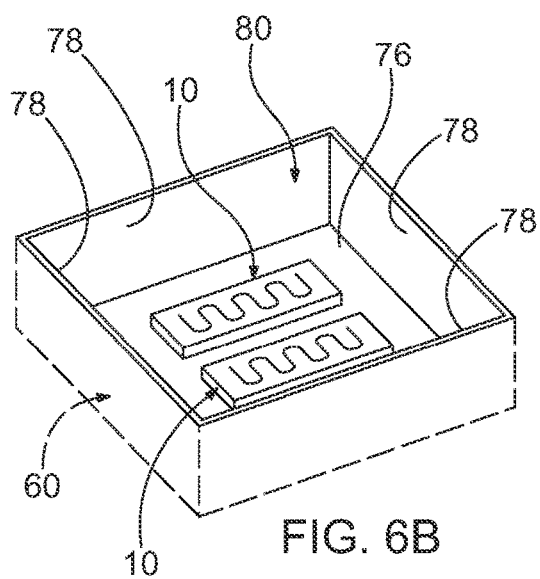

FIG. 6B is a top perspective view of the stationary latch body 60 in which the RFID tags 10 are embedded, depicted in the open position in which the RFID tags 10 are not screened. Typically, although not necessarily, the RFID tags 10 are affixed to the bottom 76 and are protected by the walls 78 that define the recess 80 in the latch body 60. Two RFID tags 10 are illustrated, but one RFID tag 10 suffices and more than two RFID tags 10 are possible. Multiple RFID tags 10 provide redundancy, assuring that the smart screening system 100 can function even if one RFID tag 10 were to fail.

Figure 6C:
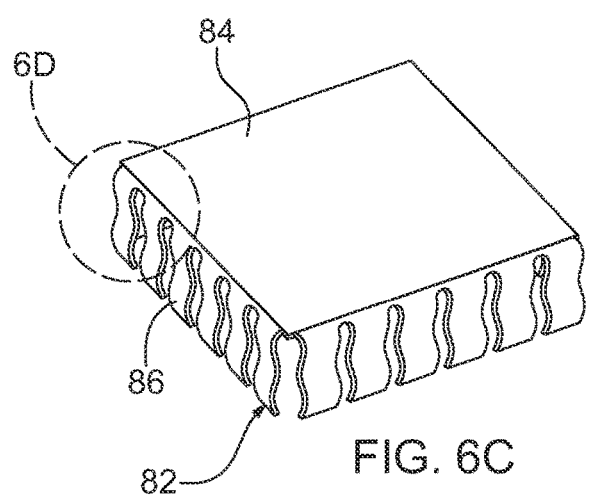
Figure 6D:
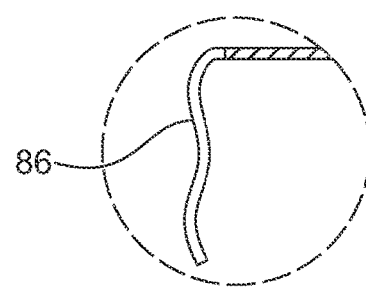

FIG. 6C is a top perspective view of the shielding cradle 82. The shielding cradle 82 has a top surface 84 from which extend downwardly a plurality of relatively flexible tangs or fingers 86. FIG. 6D is a highlighted view of one of the fingers 86 of the shielding cradle 82 shown in FIG. 6C. Preferably, the shielding cradle 82 is a single, unitary, integral component made of beryllium copper or spring steel. Such a component is available, for example, from TC Shielding Ltd. of the United Kingdom.

The shielding cradle 82 is sized to be snugly inserted into the recess 80 of the latch body 60, with the fingers 86 of the shielding cradle 82 engaging (i.e., pushing against) the walls 78 of the latch body 60, when the second latch arm 64 moves toward the latch body 60 as shown in FIG. 6A. When the second latch arm 64 contacts the latch body 60 (i.e., the second latch arm 64 is in the dashed position shown in FIG. 6A), the RFID tags 10 are electrically screened by the shielding cradle 82. In contrast, when the second latch arm 64 moves away from and out of contact with the latch body 60 (i.e., the second latch arm 64 is in the solid position shown in FIG. 6A), the RFID tags 10 are not electrically screened by the shielding cradle 82.

Figure 7:
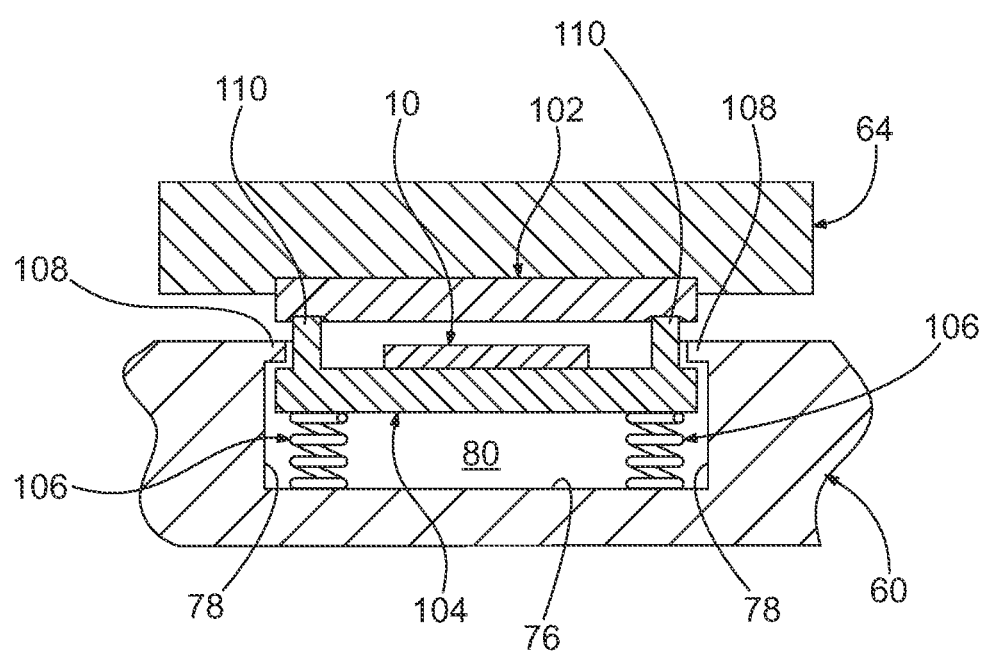
FIG. 7 is cross-sectional view of a third embodiment illustrating how the RFID tag can be either electrically screened or unscreened when the cargo restraint mechanism is opened or closed using an EMC gasket.

FIG. 7 is cross-sectional view of a third embodiment illustrating how the RFID tag 10 can be either electrically screened or unscreened when the cargo restraint mechanism 50 is opened or closed. As for the second embodiment, a static component (such as the latch body 60) of the cargo restraint mechanism 50 has a recess 80 in which one or more RFID tags 10 is or are embedded. A moving component (such as the second latch arm 64) of the cargo restraint mechanism 50 has a gasket 102. The gasket 102 may be integrally formed with the second latch arm 64. Alternatively, the gasket 102 may be a separate component that is affixed to the bottom of the second latch arm 64.

Preferably, the gasket 102 has electromagnetic compatibility (EMC). EMC is the ability of electrical components to function acceptably in their electromagnetic environment by limiting the unintentional generation, propagation, and reception of electromagnetic energy which may cause unwanted effects such as electromagnetic interference (EMI) or even physical damage to the components. The EMC gasket 102 can be made from conductive silicones, fluorosilicones, fabric wrap, and other materials commonly used to shield electronic enclosures. A suitable EMC gasket 102 is available, for example, from TC Shielding Ltd. of the United Kingdom.

As for the second embodiment, the bottom 76 and the walls 78 define the recess 80 in the latch body 60 for the third embodiment illustrated in FIG. 7. Suitably, although not necessarily, the RFID tag 10 is affixed to a translating carrier 104 located within the recess 80 of the latch body 60. One RFID tag 10 is illustrated as affixed to the carrier 104, but multiple RFID tags 10 are possible. The RFID tag 10 may be mounted or embedded in an RF-transparent material such as polyether ether ketone (PEEK). PEEK is a colorless organic thermoplastic polymer in the polyaryletherketone family.

The carrier 104 translates (i.e., moves) up and down within the confines of the recess 80. Although optional, such translation helps to accommodate tolerances, misalignment, or both. One or more springs 106 (two are shown) are affixed on one end to the bottom 76 of the recess 80 in the latch body 60 and on the opposite end to the underside of the carrier 104. The springs 106 are biased to push the carrier 104 upward. The upward movement of the carrier 104 is blocked or limited, however, by a flange 108 on the latch body 60 that defines the top opening into the recess 80. Thus, the flange 108 acts as a stop to preclude movement of the carrier 104 completely out of the recess 80. One or more legs 110 of the carrier 104 extend upward and out of the recess 80 when the carrier 104 attains its uppermost position within the recess 80.

As the second latch arm 64 moves toward the latch body 60, the gasket 102 contacts the legs 110 of the carrier 104 and pushes downward on the carrier 104 against the upward force of the springs 106. The RFID tag 10 is electrically screened by the gasket 102 when this contact occurs, as shown in FIG. 7. In contrast, when the second latch arm 64 moves away from the latch body 60, and the gasket 102 no longer contacts the legs 110 of the carrier 104, the RFID tag 10 is not electrically screened by the gasket 102.

Figure 8A:
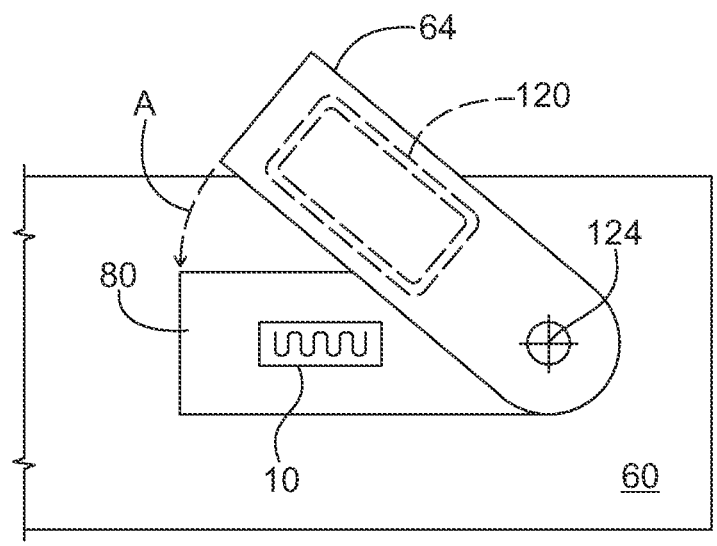
FIGS. 8A (top view) and 8B (side view) depict a fourth embodiment illustrating how the RFID tag can be either electrically screened or unscreened when the cargo restraint mechanism is opened or closed using an EMC wiper seal.

FIGS. 8A (top view) and 8B (side view) depict a fourth embodiment illustrating how the RFID tag 10 can be either electrically screened or unscreened when the cargo restraint mechanism 50 is opened or closed. As for the second and third embodiments, a static component (such as the latch body 60) of the cargo restraint mechanism 50 has a recess 80 in which one or more RFID tags 10 is or are embedded. Alternatively, the latch body 60 may not have a recess 80, in which case the one or more RFID tags 10 is or are mounted on the surface of the latch body 60. A moving component (such as the second latch arm 64) of the cargo restraint mechanism 50 has an EMC wiper seal 120. The wiper seal 120 may be integrally formed with the second latch arm 64. Alternatively, the wiper seal 120 may be a separate component that is affixed to the bottom of the second latch arm 64, preferably located in a groove 122 in the bottom of the second latch arm 64. The wiper seal 120 can be made from conductive silicones, fluorosilicones, fabric wrap, and other materials commonly used to shield electronic enclosures.

Figure 8B:
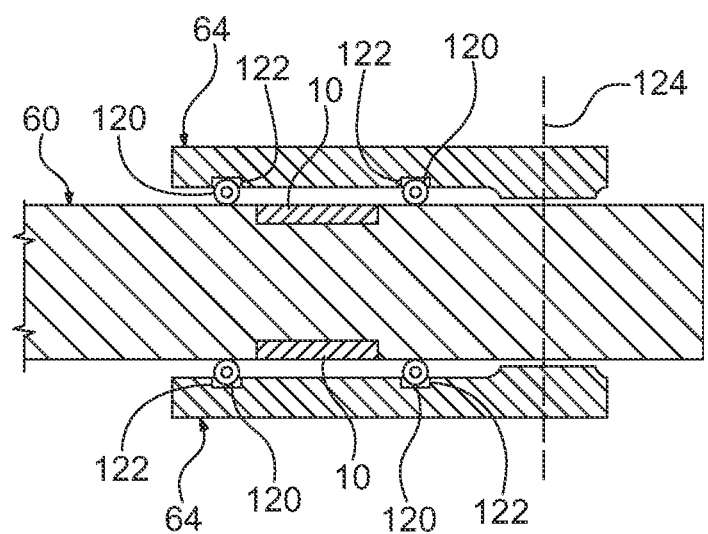

The second latch arm 64 may rotate in the direction of arrow A about a pivot axis 124. Such rotation allows the second latch arm 64 to move between a first position, as shown in FIG. 8A, in which the second latch arm 64 is not located over the RFID tag 10, and a second position, as shown in FIG. 8B, in which the second latch arm 64 is located over the RFID tag 10. The wiper seal 120 does not shield the RFID tag 10 when the second latch arm 64 is in its first position; the wiper seal 120 does shield the RFID tag 10 when the second latch arm 64 is in its second position. FIG. 8B shows that the second latch arm 64 may have two branches, each branch shielding one RFID tag 10 located on opposite sides of the latch body 60. As an artisan would recognize, however, it would also be possible to place the RFID tag 10 on the moving component (such as the second latch arm 64) and the wiper seal 120 on the static component (such as the latch body 60) of the cargo restraint mechanism 50.

Figure 9:
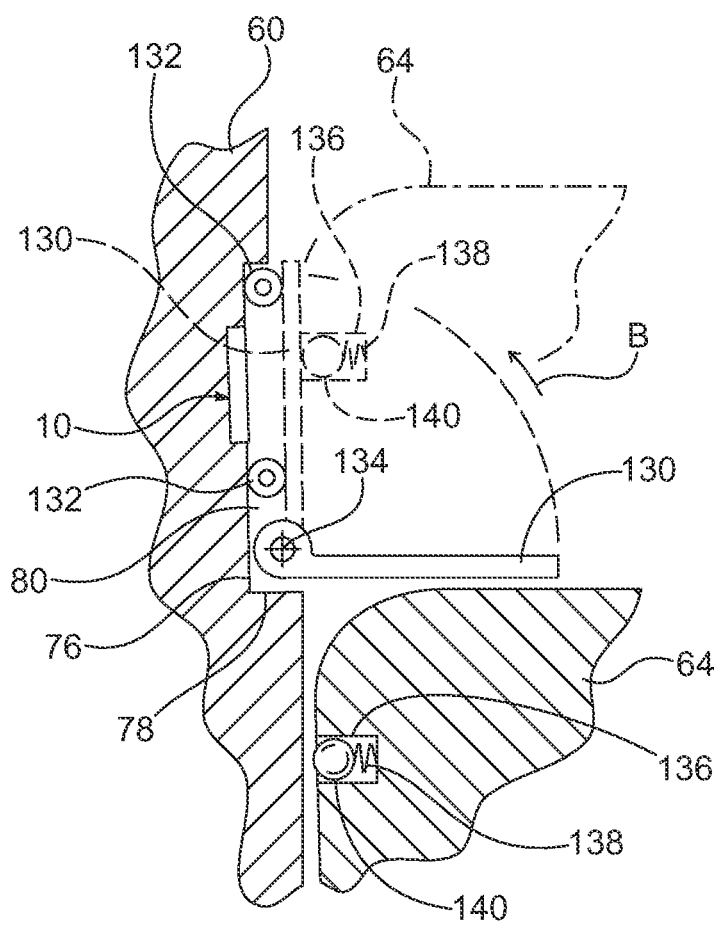
FIG. 9 is cross-sectional view of a fifth embodiment illustrating how the RFID tag can be either electrically screened or unscreened when the cargo restraint mechanism is opened or closed using an EMC pivoting flap.

As for the second and third embodiments, the bottom 76 and the walls 78 define the recess 80 in the latch body 60 for the fifth embodiment illustrated in FIG. 9. Further located in the recess 80 is the RFID tag 10. Still further based in the recess 80 is a pivoting flap 130, which rotates in the direction of arrow B about a pivot axis 132 when pushed by the second latch arm 64. Such rotation allows the pivoting flap 130 to move between a first position, as shown by solid lines in FIG. 9, in which the pivoting flap 130 is not located over the RFID tag 10, and a second position, as shown by dashed lines in FIG. 9, in which the pivoting flap 130 is located over the RFID tag 10. The pivoting flap 130 does not shield the RFID tag 10 when the pivoting flap 130 is in its first position; the pivoting flap 130 does shield the RFID tag 10 when the pivoting flap 130 is in its second position. The pivoting flap 130 can be made from conductive silicones, fluorosilicones, fabric wrap, and other materials commonly used to shield electronic enclosures. A continuous EMC gasket 132 may be provided in the recess 80 (as shown in FIG. 9) or on the pivoting flap 130 to enhance shielding of the RFID tag 10.

As illustrated in FIG. 9, the second latch arm 64 has a bore 136. Located in the bore 136 are a spring 138 and a roller ball 140. The spring 138 is affixed on one end to the bottom of the bore 136 in the second latch arm 64 and on the opposite end to the roller ball 140. The spring 138 is biased to force the roller ball 140 at least partially out of the bore 136. Thus, when the second latch arm 64 pushes the pivoting flap 130 into its second position, the spring 138 forces the roller ball 140 against the pivoting flap 130 and holds the pivoting flap 130 in position over the RFID tag 10.

The Smart Screening System

Figure 10:
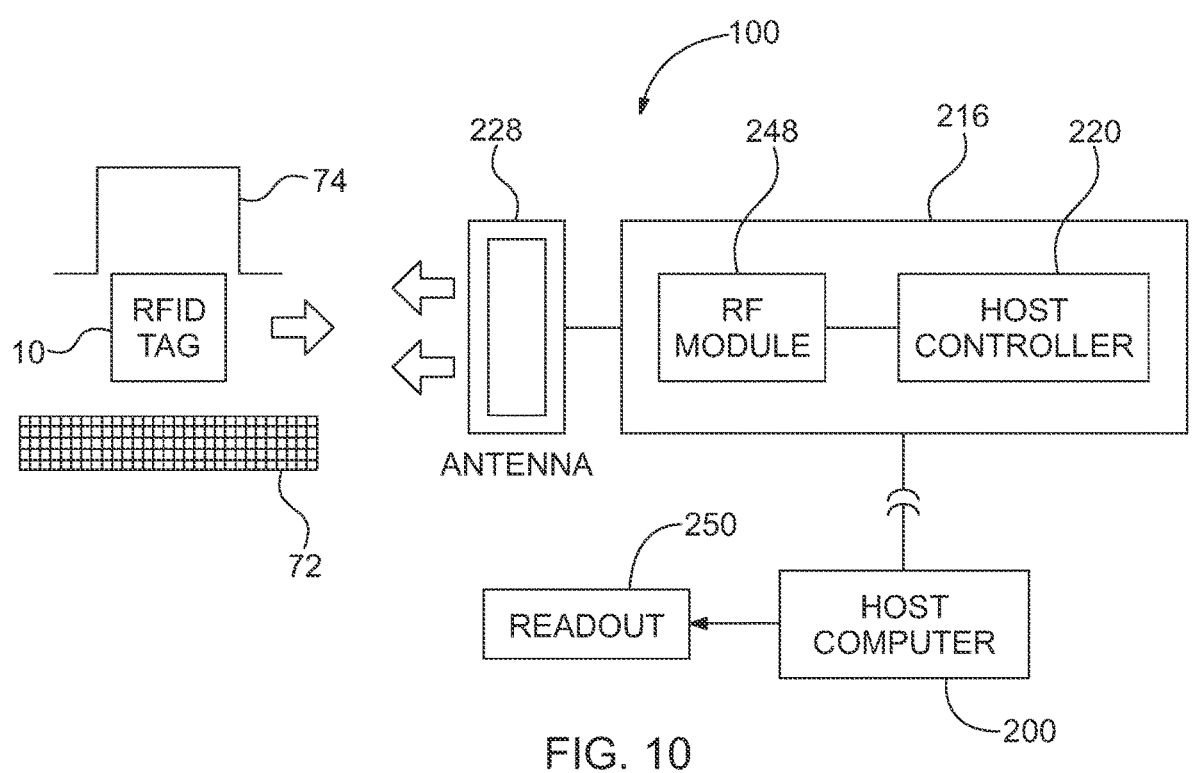
FIG. 10 is a block schematic diagram of a smart screening system according to one embodiment of the present disclosure.

As illustrated in FIG. 10, the smart screening system 100 includes the interrogator 216 (or reader) and the RFID tag 10 (or transponder). The interrogator 216 includes an RF module 248, which is linked to the second antenna 228, and the host controller 220 (or control module). The host controller 220 interfaces with a computer system 200, which may be a host computer or a hand-held computer and is described in further detail below, that provides a readout 250 (i.e., information to a user). Various configurations of these modules are suitable. For example, the RF module 248, the host controller 220, and the computer system 200 plus readout 250 could be integrated into one hand-held computer. Alternatively, the RF module 248 and the host controller 220 could be integrated into an aircraft and the host computer or hand-held computer connected externally to the aircraft when the status of the RFID tag 10 and, therefore, of the cargo restraint mechanism 50 is required.

One application for the smart screening system 100 is in combination with a cargo hold defined by a frame. The RFID tags 10 can be active, passive, or a combination of both, a micropower impulse radar (MIR) transmitter, or a Wibree transmitter (a short-range wireless protocol optimized for low power consumption), or devices providing backscatter including antennas and dihedral and corner cube reflectors. The smart screening system 100 can include multiple antennas inside or outside of the cargo space. The smart screening system 100 is preferably designed for a low power battery operation when the cargo space is not tethered to a power source. The smart screening system 100 can require little power and have a low duty cycle when not connected to a power source. Thus, the smart screening system 100 can operate for many years with internal battery power.

Figure 11:
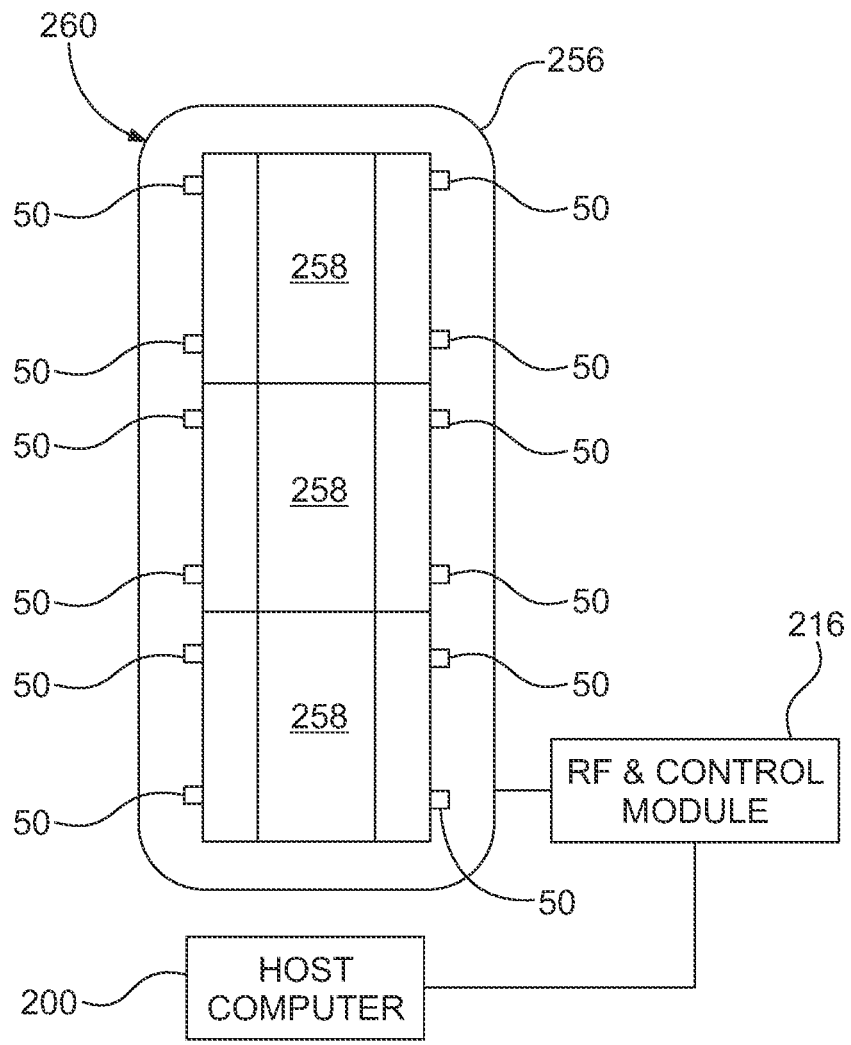
FIG. 11 is a block schematic diagram illustrating a typical installation of the smart screening system in a cargo hold.

FIG. 11 depicts a smart latch functional block diagram. Illustrated is a typical installation of multiple cargo restraint mechanisms 50 (or "smart latches") in a cargo hold 260. The cargo hold 260 carries a number of cargo pallets 258. For purposes of example only, three cargo pallets 258 are shown in the cargo hold 260 with each cargo pallet 258 subject to restraint by four cargo restraint mechanisms 50. Of course, the number of cargo pallets 258 and the number of cargo restraint mechanisms 50 per cargo pallet 258 will depend upon the specific application.

As illustrated in FIG. 11, one or both of the first antenna 222 and the second antenna 228 of the interrogator 216 can form an RF antenna ring 256. The antenna ring 256 is mounted in the aircraft cargo hold 260 and the cargo restraint mechanisms 50 are mounted around the cargo pallets 258. The interrogator 216 is connected to the antenna ring 256 via an external connector. Alternately, the interrogator 216 could be permanently installed on the aircraft. The RF module 248 of the interrogator 216 sends the interrogation command signal 230 to the RF antenna ring 256 mounted in the cargo hold 260, and this radiated RF signal is relayed to the RFID tags 10 located on the cargo restraint mechanisms 50. The computer system 200 (e.g., a host computer) enables a user such as the pilot or a member of the loading crew (cargo loaders and their supervisors) or the maintenance staff to interrogate the cargo restraint mechanisms 50 to ascertain whether they are open or closed.

Figure 12:
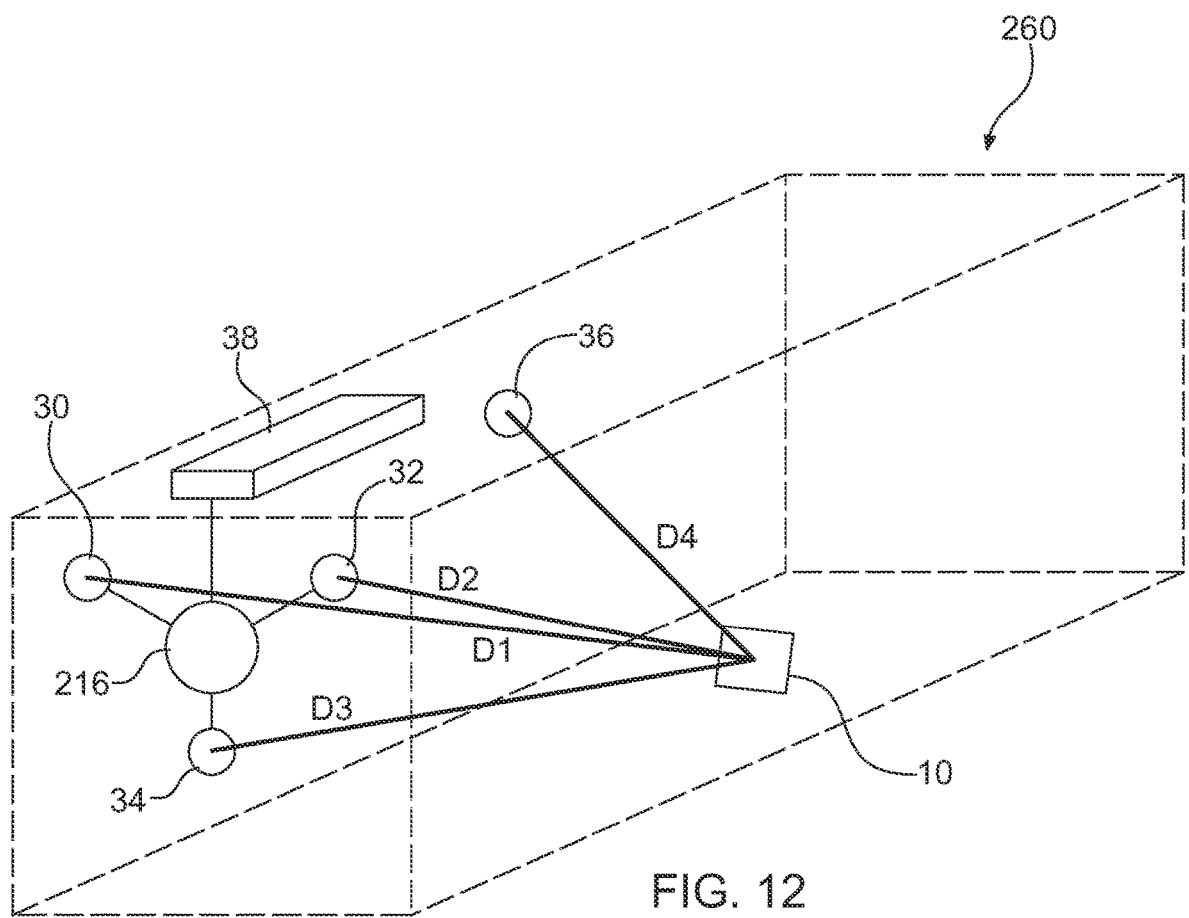
FIG. 12 illustrates an embodiment of a cargo hold equipped with the smart screening system for obtaining information from a tagged object in the cargo hold.

FIG. 12 illustrates an embodiment of a cargo hold 260 with three antennas 30, 32, and 34 spaced in a triangular fashion and connected to the interrogator 216 internal to the cargo hold 260 with the antennas 30, 32, and 34 shown in one possible configuration arranged on a common wall of the cargo hold 260. The interrogator 216 can be arranged inside or outside of the cargo hold 260, and can be mounted on the outside, within, or on the inside of a wall defining the cargo hold 260. For the cargo hold 260 shown in FIG. 12 having four walls, a roof, and a floor, for example, the antennas 30, 32, and 34 can be arranged in or on the inside or outside of the front wall. This wall may be the fixed wall opposite the door of the cargo hold 260. In other embodiments, the antennas 30, 32, and 34 can be arranged in or on the other walls, the ceiling, or the floor of the cargo hold 260 or in multiple locations.

The interrogator 216 may be arranged within the triangle defined by the antennas 30, 32, and 34, for example, at or about the approximate center of the triangle. In other embodiments with multiple antennas, the interrogator 216 may be situated to be equidistant from all of the antennas. Nevertheless, the location of the interrogator 216 relative to the antennas is not critical and the interrogator 216 may be placed anywhere on or in the vehicle defining the cargo hold 260, or even separate and apart from the vehicle, as described below. The interrogator 216 may be connected to the antennas 30, 32, and 34 using wires or wirelessly. The time delay for the signals to travel from the interrogator 216 to the antennas 30, 32, and 34 needs to be considered in the calculations to determine the distance to the RFID tag 10. These calculations are simplified if the distance to each antenna 30, 32, and 34 from the interrogator 216 is the same.

The interrogator 216 can be connected to a satellite communication unit or other communication unit 38 from its location associated with the cargo hold 260, e.g., outside or in the interior of the cargo hold 260, using a wire or wirelessly using an antenna. As shown, the communication unit 38 can be arranged on an exterior surface such as a roof of the vehicle. The satellite or other communication unit 38 can have an external antenna and can be used to send tag and other information to a remote site. The distances from each antenna 30, 32, and 34 to the RFID tag 10 are shown as D1, D2, and D3. These distances can be determined by the host controller 220 within the interrogator 216, or the information obtained by the interrogator 216 can be transmitted to another processor that may be on the frame defining the cargo hold 260 or at a remote location where the calculations can be performed. The interrogator 216 can additionally obtain information from sensors mounted in conjunction with and connected to the RFID tag 10 in addition to the tag identification.

In the above example, the interrogator 216 transmits the interrogation command signal 230 and the RFID tag 10 returns the RFID signal 232 with the desired information. An alternate approach is for the RFID tag 10, for example, to periodically transmit a signal which is received by the antennas 30, 32, and 34. If a clock in the RFID tag 10 has been synchronized with a clock in the interrogator 216, then the distances D1, D2, and D3 can be determined provided multipath and other effects are ignored or otherwise addressed. If a fourth antenna 36 is provided, at a distance D4 from the RFID tag 10, then four signals are received by the interrogator 216 and clock synchronization is unnecessary.

Computer System

Figure 13:
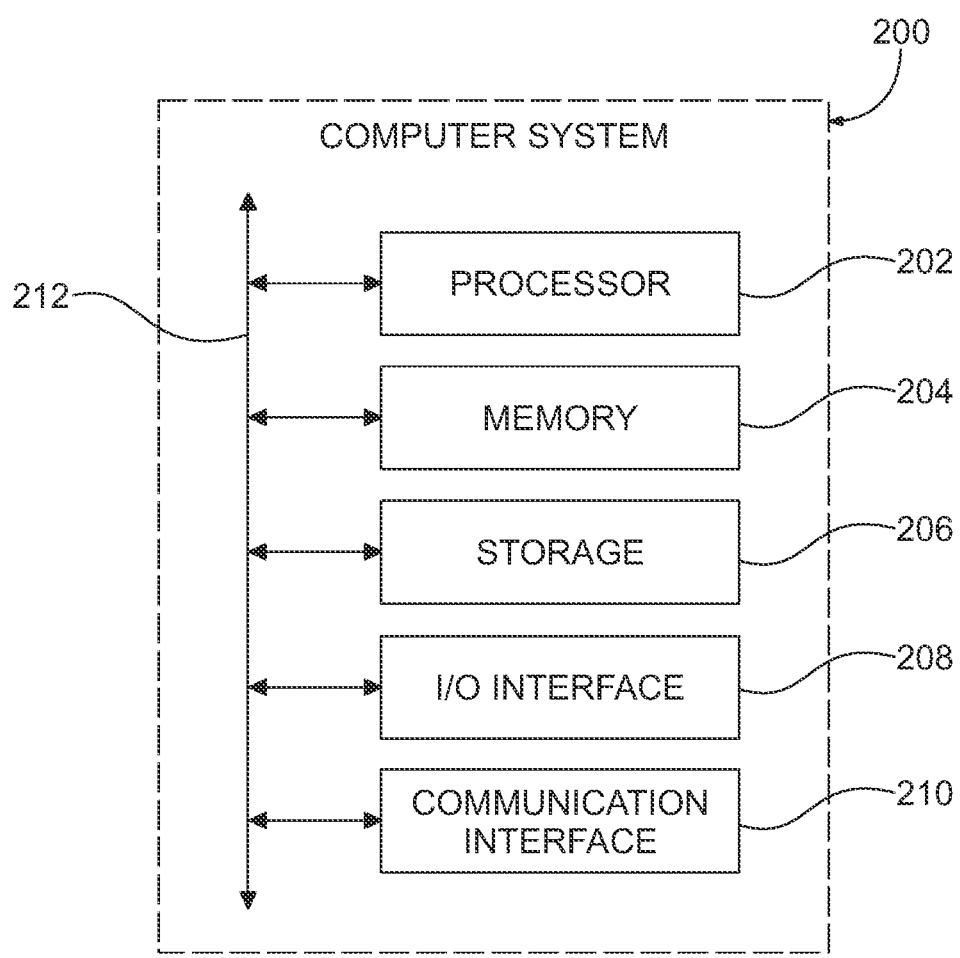
FIG. 13 illustrates an example computer system for use in connection with the smart screening system.

FIG. 13 illustrates an example computer system 200. In particular embodiments, one or more computer systems 200 engage with one or more components, and perform one or more steps of one or more methods, described or illustrated in this document. In particular embodiments, one or more computer systems 200 provide functionality described or illustrated in this document. In particular embodiments, software running on one or more computer systems 200 performs one or more steps of one or more methods described or illustrated in this document or provides functionality described or illustrated in this document. Particular embodiments include one or more portions of one or more computer systems 200. In this document, reference to a computer system may encompass a computing device, and vice versa, where appropriate. Moreover, reference to a computer system may encompass one or more computer systems, where appropriate.

This disclosure contemplates any suitable number of computer systems 200. This disclosure contemplates the computer system 200 taking any suitable physical form. As example and not by way of limitation, the computer system 200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these devices. Where appropriate, the computer system 200 may include one or more computer systems 200; be unitary or distributed; span multiple locations; span multiple machines; span multiple data centers; or reside in a cloud, which may include one or more cloud components in one or more networks. Where appropriate, one or more computer systems 200 may perform without substantial spatial or temporal limitation one or more steps of one or more methods described or illustrated in this document. As an example and not by way of limitation, the one or more computer systems 200 may perform in real time or in batch mode one or more steps of one or more methods described or illustrated in this document. The one or more computer systems 200 may perform at different times or at different locations one or more steps of one or more methods described or illustrated in this document, where appropriate.

In particular embodiments, the computer system 200 includes a processor 202, memory 204, storage 206, an input/output (I/O) interface 208, a communication interface 210, and a bus 212. Although this disclosure describes and illustrates a particular computer system having a particular number of particular components in a particular arrangement, this disclosure contemplates any suitable computer system having any suitable number of any suitable components in any suitable arrangement.

In particular embodiments, the processor 202 includes hardware for executing instructions, such as those making up a computer program. As an example and not by way of limitation, to execute instructions, the processor 202 may retrieve (or fetch) the instructions from an internal register, an internal cache, the memory 204, or the storage 206; decode and execute them; and then write one or more results to an internal register, an internal cache, the memory 204, or the storage 206. In particular embodiments, the processor 202 may include one or more internal caches for data, instructions, or addresses. This disclosure contemplates the processor 202 including any suitable number of any suitable internal caches, where appropriate. As an example and not by way of limitation, the processor 202 may include one or more instruction caches, one or more data caches, and one or more translation lookaside buffers (TLBs). Instructions in the instruction caches may be copies of instructions in the memory 204 or the storage 206, and the instruction caches may speed up retrieval of those instructions by the processor 202. Data in the data caches may be copies of data in the memory 204 or the storage 206 for instructions executing at the processor 202 to operate on; the results of previous instructions executed at the processor 202 for access by subsequent instructions executing at the processor 202 or for writing to the memory 204 or the storage 206; or other suitable data. The data caches may speed up read or write operations by the processor 202. The TLBs may speed up virtual-address translation for the processor 202. In particular embodiments, the processor 202 may include one or more internal registers for data, instructions, or addresses. This disclosure contemplates the processor 202 including any suitable number of any suitable internal registers, where appropriate. Where appropriate, the processor 202 may include one or more arithmetic logic units (ALUs); be a multi-core processor; or include one or more processors 202. Although this disclosure describes and illustrates a particular processor, this disclosure contemplates any suitable processor.

In particular embodiments, the memory 204 includes main memory for storing instructions for the processor 202 to execute or data for the processor 202 to operate on. As an example and not by way of limitation, the computer system 200 may load instructions from the storage 206 or another source (such as, for example, another computer system 200) to the memory 204. The processor 202 may then load the instructions from the memory 204 to an internal register or internal cache. To execute the instructions, the processor 202 may retrieve the instructions from the internal register or internal cache and decode them. During or after execution of the instructions, the processor 202 may write one or more results (which may be intermediate or final results) to the internal register or internal cache. The processor 202 may then write one or more of those results to the memory 204. In particular embodiments, the processor 202 executes only instructions in one or more internal registers or internal caches or in the memory 204 (as opposed to the storage 206 or elsewhere) and operates only on data in one or more internal registers or internal caches or in the memory 204 (as opposed to the storage 206 or elsewhere). One or more memory buses (which may each include an address bus and a data bus) may couple the processor 202 to the memory 204. The bus 212 may include one or more memory buses, as described below. In particular embodiments, one or more memory management units (MMUs) reside between the processor 202 and the memory 204 and facilitate accesses to the memory 204 requested by the processor 202. In particular embodiments, the memory 204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. The memory 204 may include one or more memories 204, where appropriate. Although this disclosure describes and illustrates particular memory, this disclosure contemplates any suitable memory.

In particular embodiments, the storage 206 includes mass storage for data or instructions. As an example and not by way of limitation, the storage 206 may include a hard disk drive (HDD), a floppy disk drive, flash memory, an optical disc, a magneto-optical disc, magnetic tape, or a Universal Serial Bus (USB) drive or a combination of two or more of these. The storage 206 may include removable or non-removable (or fixed) media, where appropriate. The storage 206 may be internal or external to the computer system 200, where appropriate. In particular embodiments, the storage 206 is non-volatile, solid-state memory. In particular embodiments, the storage 206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates the storage 206 taking any suitable physical form. The storage 206 may include one or more storage control units facilitating communication between the processor 202 and the storage 206, where appropriate. Where appropriate, the storage 206 may include one or more storages 206. Although this disclosure describes and illustrates particular storage, this disclosure contemplates any suitable storage.

In particular embodiments, the I/O interface 208 includes hardware, software, or both, providing one or more interfaces for communication between the computer system 200 and one or more I/O devices. The computer system 200 may include one or more of these I/O devices, where appropriate. One or more of these I/O devices may enable communication between a person and the computer system 200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 208 for them. Where appropriate, the I/O interface 208 may include one or more device or software drivers enabling the processor 202 to drive one or more of these I/O devices. The I/O interface 208 may include one or more I/O interfaces 208, where appropriate. Although this disclosure describes and illustrates a particular I/O interface, this disclosure contemplates any suitable I/O interface.

In particular embodiments, the communication interface 210 includes hardware, software, or both providing one or more interfaces for communication (such as, for example, packet-based communication) between the computer system 200 and one or more other computer systems 200 or one or more networks. As an example and not by way of limitation, the communication interface 210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 210 for it. As an example and not by way of limitation, the computer system 200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the computer system 200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. The computer system 200 may include any suitable communication interface 210 for any of these networks, where appropriate. The communication interface 210 may include one or more communication interfaces 210, where appropriate. Although this disclosure describes and illustrates a particular communication interface, this disclosure contemplates any suitable communication interface.

In particular embodiments, the bus 212 includes hardware, software, or both coupling components of the computer system 200 to each other. As an example and not by way of limitation, the bus 212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. The bus 212 may include one or more buses 212, where appropriate. Although this disclosure describes and illustrates a particular bus, this disclosure contemplates any suitable bus or interconnect.

In this document, a computer-readable non-transitory storage medium or media may include one or more semiconductor-based or other integrated circuits (ICs) (such as, for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of the processor 202 (such as, for example, one or more internal registers or caches), one or more portions of the memory 204, one or more portions of the storage 206, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. In this document, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), JavaScript Object Notation (JSON) or other suitable markup language.

The smart screening system 100 enables users of the smart screening system 100 such as cargo loaders, supervisors, or pilots to interrogate cargo restraint mechanisms 50 via a remote computer system 200 to ascertain whether the cargo restraint mechanisms 50 are all closed and that the cargo is therefore securely held. This functionality of the smart screening system 100 minimizes the likelihood of cargo shift (during flight if the vehicle is an airplane) caused by incorrectly closed cargo restraint mechanisms 50, and improves the safety of vehicles such as cargo aircraft.

Wireless Uplock Application

As mentioned above, additional applications for the smart screening system 100 exist beyond detecting the status (i.e., whether in the open or closed position) of cargo latches, cargo container stops, and cargo side guidance devices, as used for cargo pallets in aerospace, ground, and land applications. One such additional application for the smart screening system 100 is for the wireless detection of the status (i.e., whether in the open or closed position) of landing gear uplocks, door uplocks, and any such equipment that requires uplock status indication in an aerospace application. U.S. Pat. No. 6,811,118 discloses an embodiment of a conventional uplock. Retractable aircraft landing gear systems use uplocks to mechanically lock the landing gear in its stowed, retracted, or closed position during flight. This is done to prevent the landing gear from prematurely deploying due to a hydraulic system failure in the aircraft. Aircraft landing gear uplocks consist of a hydraulically actuated mechanical hook system that latches the landing gear in place and unlocks the landing gear during landing so that it can be deployed.

Figure 14A:
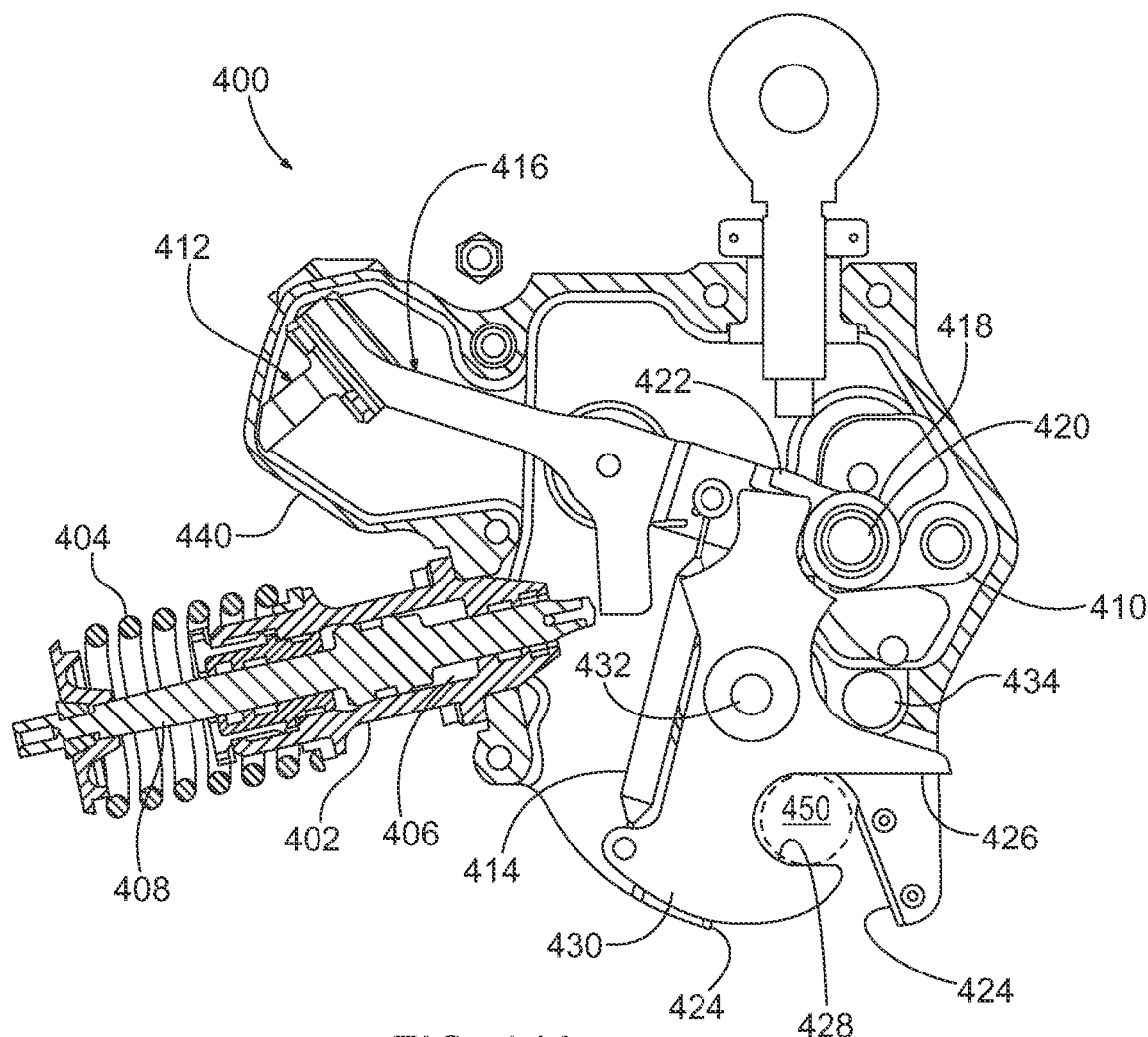
FIG. 14A shows a conventional landing gear uplock unit in its locked position.
Figure 14B:
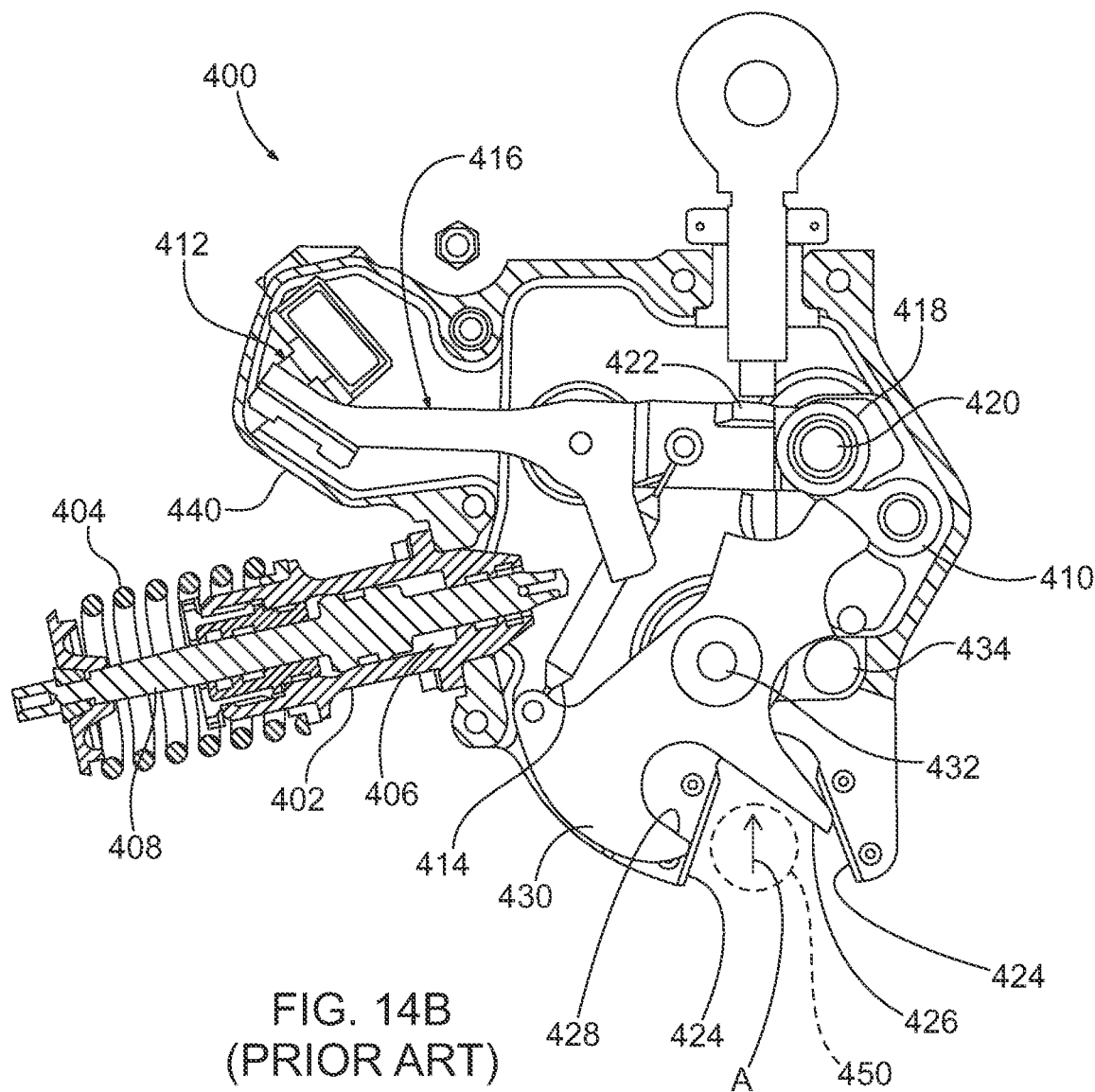
FIG. 14B depicts the conventional landing gear uplock unit shown in FIG. 14A in its unlocked position.

The description of the uplock application begins with the general structure of a conventional uplock unit 400 as illustrated in FIGS. 14A and 14B. FIG. 14A shows the uplock unit 400 in the locked position and FIG. 14B shows the uplock unit 400 in the unlocked position. When in the locked position shown in FIG. 14A, the uplock unit 400 engages a portion 450 of the landing gear such as a pin, a leg, or a nut.

The uplock unit 400 has a hydraulic actuator 402 to release the lock and a manual release lever 410 for emergency release. The hydraulic actuator 402 is a two-way type: the hydraulic actuator 402 extends to release the uplock unit 400 and is retracted to allow the uplock unit 400 to lock. FIG. 14A shows the hydraulic actuator 402 in its retracted position. Retraction is achieved by hydraulic power or through the use of an integral compression spring 404. The compression spring 404 also prevents inadvertent unlocking due to back pressure in the actuator extend line (not shown). In addition to the compression spring 404, the hydraulic actuator 402 includes a chamber 406 and a piston 408.

Dual proximity switches or sensors 412 are provided on the housing 440 of the uplock unit 400 for lock indication. One or more tension springs 414 pull a latch 416, which has a latch roller 418 located on a latch roller pin 420, in a clockwise direction until the latch 416 contacts a latch stop pad 422. The proximity switches 412 then indicate that the uplock unit 400 is "locked."

The uplock unit 400 starts in the unlocked position, shown in FIG. 14B, in which the proximity sensors 412 indicate that the uplock unit 400 is "unlocked." The portion 450 of the landing gear is retracted (upward in the direction of arrow A) into a pair of jaws 424. Hydraulic pressure is supplied to the chamber 406 of the hydraulic actuator 402 moving the piston 408 away from the latch 416. The tension spring 414 pulls the latch 416 until the latch roller 418 is in contact with a hook 430 having a mouth defined by an upper mouth surface 426 and a lower mouth surface 428. The jaws 424 guide the portion 450 of the landing gear into engagement with the upper mouth surface 426 of the hook 430. The upward force exerted by the portion 450 of the landing gear rotates the hook 430 anti-clockwise about its pivot 432 until the hook 430 contacts an up-stop pin 434.

During the normal operation of the uplock unit 400, when the latch 416 has rotated enough to release the hook 430, the hook 430 rotates and the portion 450 of the landing gear is released. The tension spring 414 pulls the hook 430 in a clockwise direction until the hook 430 contacts the up-stop pin 434, which prevents the hook 430 from relocking. The proximity sensors 412 then indicate "unlocked."

During the free-fall release operation of the uplock unit 400, the portion 450 of the landing gear exerts a downward force on the hook 430. The force tries to rotate the hook 430 clockwise but the hook 430 cannot move because the latch 416 and latch roller 418 restrain the movement. The manual release lever 410 is rotated clockwise until it contacts the latch roller 418 on the latch roller pin 420. The manual release lever 410 rotates the latch 416 anti-clockwise around its pivot.

Figure 15A:
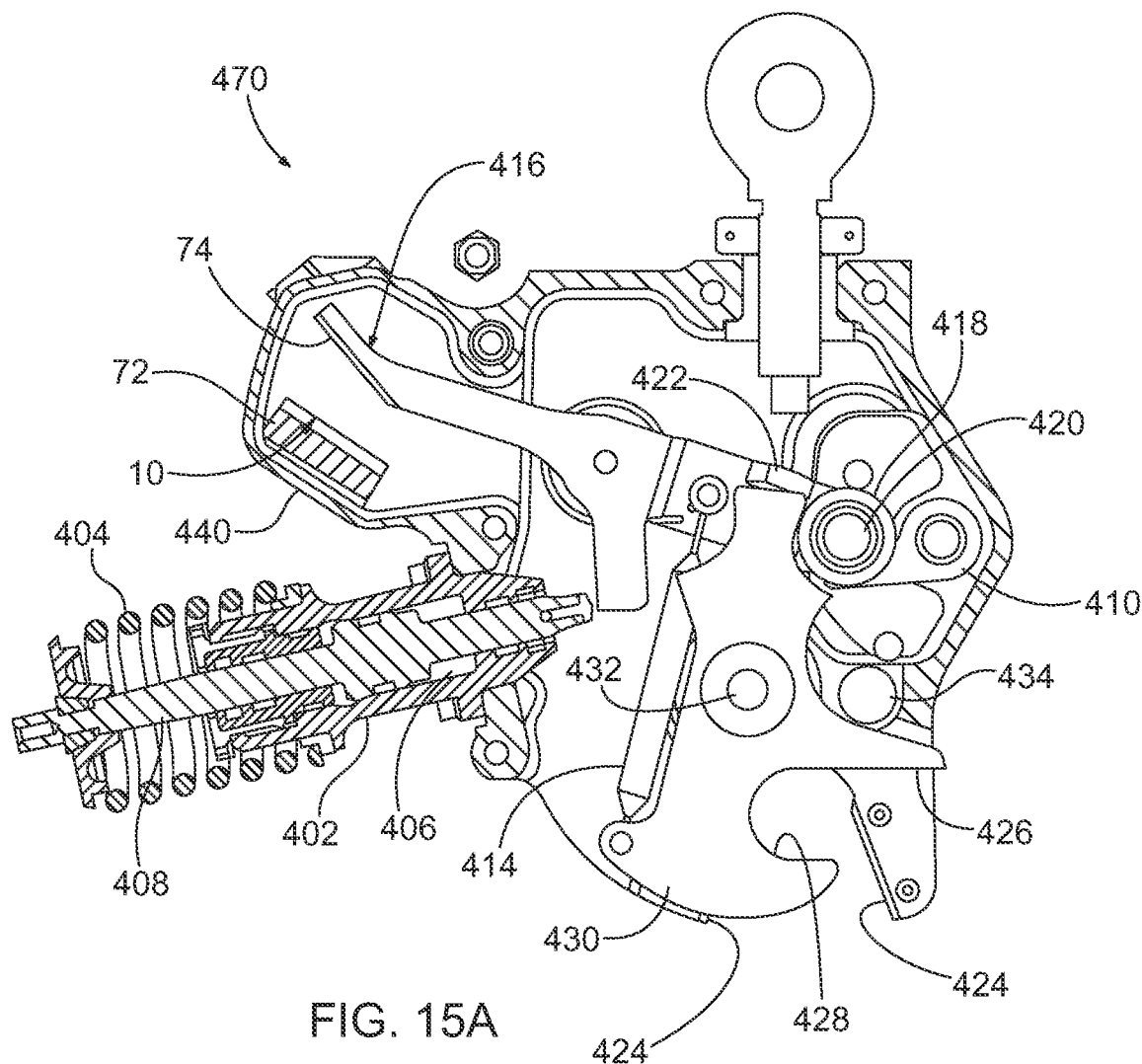
FIG. 15A shows a landing gear uplock unit in accordance with another embodiment of the present disclosure, depicted in the closed or locked position in which the RFID tag is not screened.
Figure 15B:
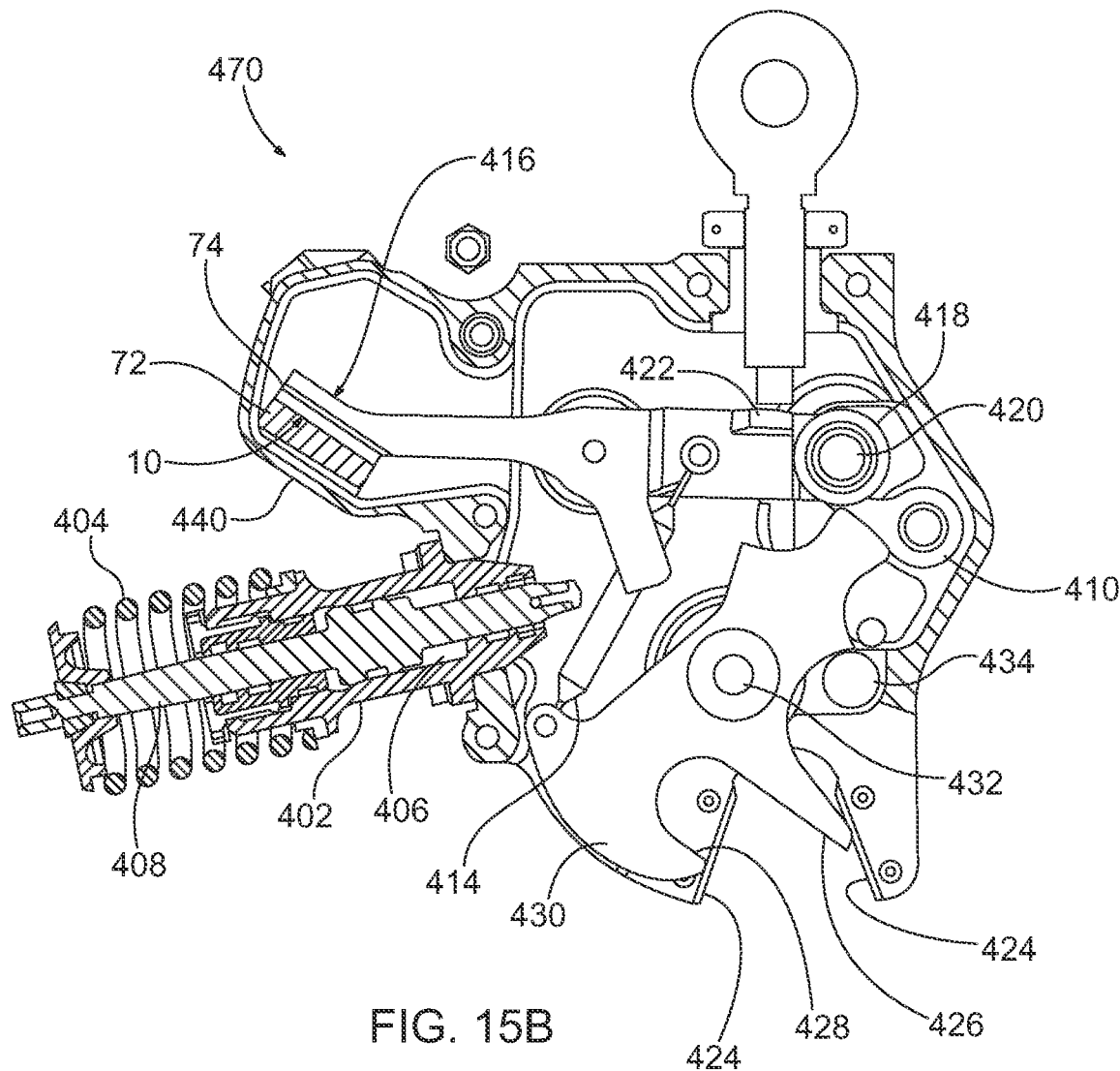
FIG. 15B is a view of the landing gear uplock unit shown in FIG. 15A, depicted in the open or unlocked position in which the RFID tag is screened.

FIGS. 15A and 15B illustrate the additional application of the smart screening system 100 to a smart landing gear uplock unit 470. More specifically, FIG. 15A shows the smart uplock unit 470 in the closed or locked position; FIG. 15B shows the smart uplock unit 470 in the open or unlocked position. The smart landing gear uplock unit 470 has many but not all of the same components (labeled with the same element numbers) as the conventional uplock unit 400.

According to the present disclosure, and as illustrated in FIGS. 15A and 15B, the RFID tag 10 can be mounted either onto or into the smart uplock unit 470 such that the movement of certain components of the smart uplock unit 470 causes the RFID tag 10 to be either electrically screened or unscreened when the smart uplock unit 470 is opened or closed. The RFID tag 10 is mounted on the smart uplock unit 470 in a location or position that enables the RFID tag 10 to indicate to the interrogator 216, through the RFID signal 232, whether the smart uplock unit 470 is in its open or closed state. Preferably, the RFID tag 10 is mounted on a static component of the smart uplock unit 470 (although it is possible to mount the RFID tag 10 on a moving part of the smart uplock unit 470). For the example embodiment illustrated in FIGS. 15A and 15B, the RFID tag 10 is mounted on the housing 440 of the smart uplock unit 470.

A number of structural embodiments are possible to enable the RFID tag 10 to indicate to the interrogator 216 the open or closed state of the smart uplock unit 470. For the example embodiment illustrated in FIGS. 15A and 15B, a screen is provided. The screen has two halves: (a) the back screen 72 located between the RFID tag 10 and the housing 440 and on which the RFID tag 10 is mounted; and (b) the front screen 74 (or cover) which may be mounted on a moving part of the smart uplock unit 470 such as the latch 416. (If the back screen 72 and the RFID tag 10 were located on a moving part of the smart uplock unit 470, then the front screen 74 would be located on a static part of the smart uplock unit 470.) When the smart uplock unit 470 is in its closed state, as shown in FIG. 15A, the front screen 74 does not cover the RFID tag 10. This configuration allows the RFID tag 10 to receive and transmit RF signals. The interrogator 216 determines that the smart uplock unit 470 is in its closed state when the interrogator 216 receives the RFID signal 232 from the RFID tag 10.

In contrast, when the smart uplock unit 470 is in its open state, as shown in FIG. 15B, the front screen 74 covers the RFID tag 10 so that the RFID tag 10 is sandwiched between the front screen 74 and the back screen 72. This configuration effectively electrically screens the RFID tag 10, preventing the RFID tag 10 from receiving or transmitting RF signals. Thus, when screened or shielded, the RFID tag 10 cannot receive the interrogation command signal 230 or transmit the RFID signal 232. The interrogator 216 determines that the smart uplock unit 470 is in its open state when interrogator 216 fails to receive the RFID signal 232 from the RFID tag 10. As indicated above for the embodiment in which the smart screening system 100 is applied to the cargo restraint mechanism 50, a wide variety of materials can be used to form the screen for the embodiment in which the smart screening system 100 is applied to the smart uplock unit 470.

Figure 16:
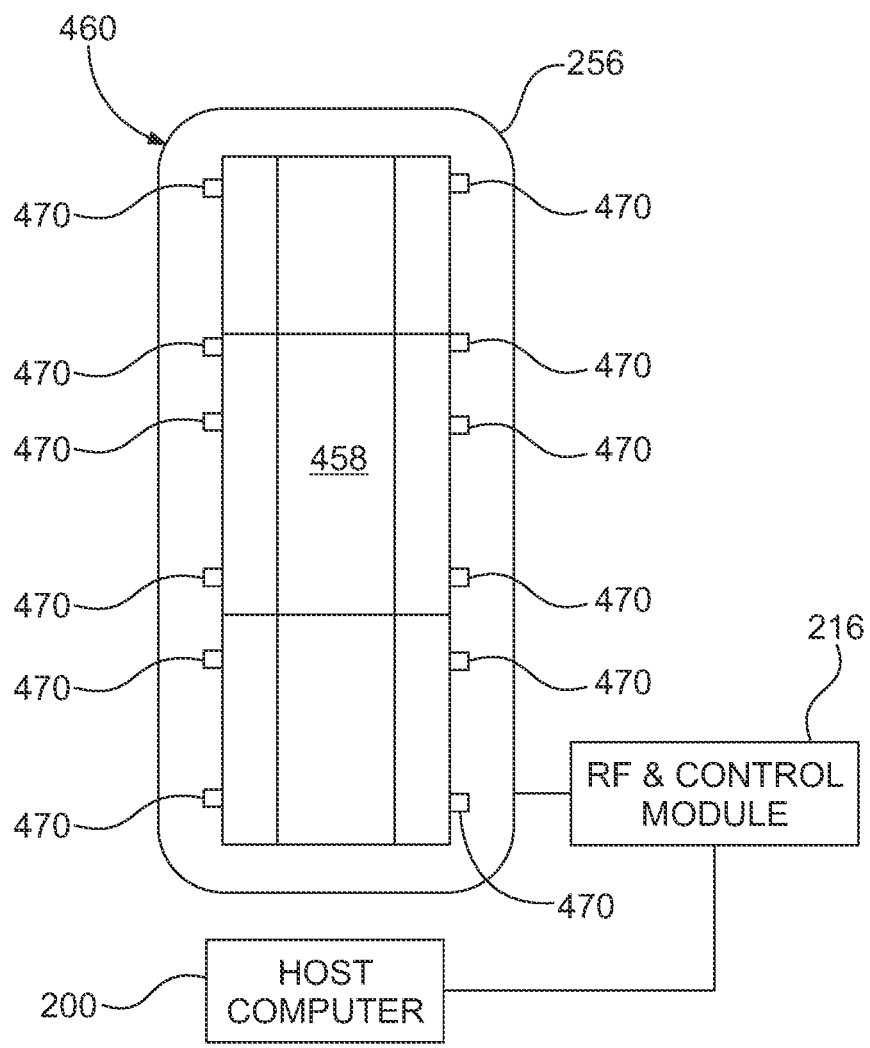
FIG. 16 is a block schematic diagram illustrating a typical installation of the smart screening system in a landing gear bay.

FIG. 16 is a block schematic diagram illustrating a typical installation of the smart screening system 100 including multiple smart uplock units 470 in a landing gear bay 460. (Recall that FIG. 11 illustrated a typical installation of multiple cargo restraint mechanisms 50 or "smart latches" in a cargo hold 260.) A segmented door 548 provides and precludes access to the landing gear bay 460. As illustrated in FIG. 16, one or both of the first antenna 222 and the second antenna 228 of the interrogator 216 can form the RF antenna ring 256. The antenna ring 256 is mounted in the aircraft landing gear bay 460 and the smart uplock units 470 are mounted around the segmented door 548. Alternatively, the smart uplock units 470 could be mounted on other aircraft structure in the vicinity of the landing gear bay 460. The interrogator 216 is connected to the antenna ring 256 via an external connector. Alternately, the interrogator 216 could be permanently installed on the aircraft. The RF module 248 of the interrogator 216 sends the interrogation command signal 230 to the RF antenna ring 256 mounted in the landing gear bay 460, and this radiated RF signal is relayed to the RFID tags 10 located on the smart uplock units 470. The computer system 200 (e.g., a host computer) enables a user such as the pilot or a member of the crew or the maintenance staff (or other aircraft systems) to interrogate the smart uplock units 470 to ascertain whether they are open or closed.

In summary, landing gear and landing gear doors on aircraft are held in position by uplock units. An indication of the status of the uplock units is normally obtained via micro-switches or proximity sensors, both of which require significant wiring routed through the aircraft. The use of the smart uplock unit 470 (which is wireless) will significantly reduce the wiring required for the uplock unit status system and will provide a more robust system. The smart uplock unit 470 enables the aircraft maintenance systems or landing gear computers to interrogate the uplock unit status via a remote computer or a hand-held computer to ascertain if the uplock units are all closed and that the landing gear, landing gear doors, or both are therefore securely held.

The smart screening system 100 including multiple smart uplock units 470 introduces a method of integrating passive or active RFID tags 10 with the smart uplock units 470 such that the action of moving the smart uplock unit 470 to its opened or closed position electrically screens or un-screens the RFID tag 10. A computer system 200 integrated with a transceiver interrogates the RFID tags 10 to check whether they are screened or un-screened based on the position (closed or open) of the smart uplock units 470. An antenna 222 or antennae 222, 228 mounted in the landing gear bay 460 and the computer system 200 send the RF interrogation command signal 230 through the antenna(e) in the landing gear bay 460. The RF interrogation command signal 230 will be picked up only by the un-screened RFID tags 10; these un-screened RFID tags 10 will respond to the RF interrogation command signal 230 and the computer system 200 will indicate which of the RFID tags 10 has responded. The pilot, maintenance computer, or landing gear computer will then be able to confirm the integrity and safety of the smart uplock units 470.

Although illustrated and described above with reference to certain specific embodiments and examples, the present disclosure is nevertheless not intended to be limited to the details shown. Rather, various modifications may be made in the details within the scope and range of equivalents of the claims and without departing from the spirit of the disclosure. It is expressly intended, for example, that components or elements of one embodiment may be replaced with components or elements of another embodiment.

What is claimed:

1. A smart screening system for identifying the open or closed state of a cargo restraint mechanism configured to hold cargo in a vehicle, the system comprising:
    an RFID tag integral with or attached to the cargo restraint mechanism and configured to send and receive signals;
    a screen integral with or mounted on the cargo restraint mechanism so that the screen blocks the signals to and from the RFID tag when the cargo restraint mechanism is in either the open or closed state and allows the signals to and from the RFID tag when the cargo restraint mechanism is in the other state,
        wherein the screen has two halves: a back screen located between the RFID tag and the cargo restraint mechanism and a front screen which covers the RFID tag so that the RFID tag is sandwiched between the front screen and the back screen when the cargo restraint mechanism is in one but not the other of its open and closed states;
    an interrogator configured to send the signals to the RFID tag, to receive the signals from the RFID tag, to ascertain whether the RFID tag is blocked by the screen, and to generate an indicator of whether the cargo restraint mechanism is in the open or closed state; and
    a computer configured to receive the indicator from the interrogator and provide a readout identifying the state of the cargo restraint mechanism,
    wherein the likelihood of shift of the cargo is minimized and the safety of both the cargo and the vehicle holding the cargo is enhanced.

2. The smart screening system of claim 1, wherein the cargo restraint mechanism is a latch, a hold-down device, a container stop, or a side guidance device.

3. The smart screening system of claim 1, wherein the system identifies the open or closed state of multiple cargo restraint mechanisms, each cargo restraint mechanism having at least one RFID tag and an associated screen.

4. The smart screening system of claim 1, wherein the RFID tag is passive.

5. The smart screening system of claim 1, wherein the RFID tag is active.

6. The smart screening system of claim 1, wherein the screen is made of one or more of aluminum, mu-metal, carbon, carbon fiber, and copper.

7. The smart screening system of claim 1, wherein the cargo restraint mechanism has a recess, defined by walls, in which the RFID tag is located and the screen is (a) a shielding cradle being sized to be snugly inserted into the recess and having fingers that engage the walls when the cargo restraint mechanism is in one but not the other of its open and closed states; (b) a gasket having electromagnetic compatibility; (c) a wiper seal having electromagnetic compatibility; or (d) a pivoting flap based in the recess.

8. A cargo hold for a vehicle, the cargo hold carrying at least one item of cargo to which is associated at least one cargo restraint mechanism, the cargo hold comprising the smart screening system of claim 1.

* * * * *